US010602234B2

(12) United States Patent
Sanchez et al.

(10) Patent No.: US 10,602,234 B2
(45) Date of Patent: Mar. 24, 2020

(54) SYSTEMS AND METHODS FOR GAMIFICATION OF REAL-TIME INSTRUCTIONAL COMMENTATING

(71) Applicant: Rovi Guides, Inc., San Jose, CA (US)

(72) Inventors: Mario Miguel Sanchez, San Jose, CA (US); Dylan Matthew Wondra, Mountain View, CA (US); Jean Michelle Somlo, Sunnyvale, CA (US); Michaela Schlocker Logan, San Jose, CA (US); William L. Thomas, Evergreen, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/033,711

(22) Filed: Jul. 12, 2018

(65) Prior Publication Data

US 2020/0021894 A1 Jan. 16, 2020

(51) Int. Cl.
| | | |
|---|---|---|
| *H04N 7/10* | (2006.01) | |
| *H04N 21/81* | (2011.01) | |
| *H04N 21/2187* | (2011.01) | |
| *G10L 25/63* | (2013.01) | |
| *G10L 15/08* | (2006.01) | |
| *G10L 15/22* | (2006.01) | |

(52) U.S. Cl.
CPC ......... *H04N 21/8106* (2013.01); *G10L 15/08* (2013.01); *G10L 15/22* (2013.01); *G10L 25/63* (2013.01); *H04N 21/2187* (2013.01); *G10L 2015/088* (2013.01); *G10L 2015/223* (2013.01)

(58) Field of Classification Search
CPC ................................................ H04N 21/4722
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,111,534 B1* | 8/2015 | Sylvester | G10L 13/00 |
| 9,900,632 B1* | 2/2018 | Flores Guerra | H04N 21/4884 |
| 2002/0174430 A1 | 11/2002 | Ellis et al. | |
| 2005/0251827 A1 | 11/2005 | Ellis et al. | |
| 2010/0153885 A1 | 6/2010 | Yates | |
| 2011/0126252 A1* | 5/2011 | Roberts | H04N 7/17318 725/114 |
| 2014/0164507 A1* | 6/2014 | Tesch | H04L 51/10 709/204 |
| 2014/0215505 A1* | 7/2014 | Balasubramanian | H04N 21/4722 725/13 |
| 2017/0205991 A1* | 7/2017 | Hewson | H04L 51/32 |

* cited by examiner

*Primary Examiner* — Gigi L Dubasky
(74) *Attorney, Agent, or Firm* — Haley Guiliano LLP

(57) ABSTRACT

Systems and methods for providing a viewer with relevant commentary for a live video. For example, a media guidance application may receive, during playback of a live video, a request for clarification regarding an aspect (e.g., a play, a score, a player, a strategy, etc.) of the live video. In response to receiving the request, the media guidance application may identify the aspect and identify videos generated by other viewers explaining the aspect. The media guidance application may further select one of the videos based on a preference of the viewer, and cause a user device to play back the selected video to the viewer.

20 Claims, 14 Drawing Sheets

SYSTEMS AND METHODS FOR GAMIFICATION OF REAL-TIME INSTRUCTIONAL COMMENTATING

BACKGROUND

In the related art, a system may determine a knowledge level of a viewer of a live sporting event, and may determine whether to present explanations of sports terminology to the viewer based on the user's knowledge level. The system may then search a sports database, the Internet, or a social network associated with the user for an explanation of the sports terminology, and provide the explanation to the user. To that end, the related art relies on prerecorded and generalized explanations of sports terminology.

SUMMARY

The advancement in digital transmission of media content has increased the amount of data that can be transmitted, and the speed at which that data can be made available to an audience. Further, advancements in voice processing are allowing viewers to provide natural language voice input to media systems, and the media systems may identify commands or instructions based on the voice input. These advancements enable media systems to determine when a viewer would like to receive additional media content related to media content currently being played back based on real-time feedback, and further narrowly tailor the additional media content based on the voice input received and preferences associated with the viewer. For example, when a viewer is watching a live event and asks for clarification regarding an aspect of the event, the media systems may provide the viewer with explanatory information. However, existing media systems rely on prerecorded content and information, and thus fail to account for the problems created when a viewer is requesting clarification regarding an aspect of or occurrence in a live video of an event.

Accordingly, to overcome the problems when providing a viewer with explanatory content regarding a live event (e.g., a live newscast, sporting event, gaming event, reality event, and/or any other live event), systems and methods are provided herein for providing a viewer with relevant commentary for a live video by playing back a video with explanatory commentary generated by another viewer while watching the same live event. For example, a media guidance application may determine, based on input provided by the viewer, that the viewer is requesting clarification regarding an aspect (e.g., a history, a context, a play, a score, a player, a strategy, etc.) of the live event. In an example, the media guidance application may determine that the viewer of a live broadcast of a tennis match is confused as to why a particular ball played was not called out. For example, the media guidance application may detect a query from the viewer asking "Why was that last ball not called out?" The media guidance application may then determine that the viewer is confused about why the last ball played in the live tennis match was not called out, and may identify videos (e.g., live-stream videos) generated by other viewers of the live tennis match who are providing commentary on the tennis match and determine whether the commentary explains the aspect regarding which the viewer is confused. The other viewers may be generating the videos in real time as they are watching the live tennis match, and the media guidance application may identify the videos in near-real-time as the videos are generated. For example, the media guidance application may identify the videos while the other viewers are generating the videos, as opposed to only after the videos are fully generated. In the example, the media guidance application may select a video generated by another viewer explaining that the ball was not called out because it clipped the net. The media guidance application may then play back to the viewer the video generated by the other viewer explaining the aspect about which the viewer is confused. As a result, the media guidance application may provide the viewer with explanatory commentary that is relevant to the actual live event that the viewer is watching, and not a general explanation regarding the event (e.g., regarding the rules of tennis), which may not explain the particular aspect about which the viewer is confused. While the below disclosure uses a live sporting event (a live tennis match) as an example of a live event, those skilled in the art will appreciate that this is only for illustrative purposes and not intended to be limiting, and that it is contemplated that the methods and systems described below may be used to provide viewers with explanatory commentary for any live event, including a live newscast, sporting event, gaming event, reality event, and/or any other live event.

In some aspects of the disclosure, a media guidance application may play back a live video simultaneously to a plurality of viewers. For example, the media guidance application may play back a live transmission, such as a live stream, broadcast, narrowcast, direct feed, etc., of a live tennis match that is received from a content provider. The media guidance application may play back the live video at a predetermined transmission start time. For example, the media guidance application may play back the live tennis match at a scheduled broadcast start time.

In some embodiments, the media guidance application may receive, during playback of the live video, input from a first viewer of the plurality of viewers. The media guidance application may receive input including a reference to an aspect of a segment of the live video. For example, the first viewer may be confused about an aspect of the live tennis match, and may provide input to the media guidance application requesting clarification regarding the aspect about which the first viewer is confused. In the example, while watching the live tennis match being played back by the media guidance application, the first viewer may become confused about a rule of the sport, a strategy employed by a player, a call made by a referee or umpire, a scoring mechanism, etc., and may provide input in the form of a voice command to the media guidance application requesting clarification regarding that aspect. For example, the first viewer may ask "Why was that last ball not called out?" and the media guidance application may receive the first viewer's question as input.

In some embodiments, the media guidance application may receive the voice input from the first viewer via a microphone associated with a device on which the media guidance application is executing, a device on which the media guidance application is playing back the live video, and/or a device associated with the device on which the media guidance application is executing or the device on which the live video is played back. For example, the media guidance application may receive the input via a microphone included in a user device that is associated with a television on which the live video is being played back. In some embodiments, the user device is a continuous-listening device.

In some embodiments, after receiving the voice input from the first viewer, the media guidance application may generate an audio signature based on the voice input received from the first viewer. For example, the media guidance application may process the voice input received from the first viewer to isolate words spoken by the first viewer from background noise, and may generate an audio signature, such as an acoustic fingerprint, corresponding to each of the words spoken by the first viewer.

In some embodiments, the media guidance application may then compare the audio signature with a plurality of audio signature templates stored in a database. For example, the media guidance application may compare the audio signature corresponding to each of the words spoken by the first viewer with the audio signature templates stored in the database in order to identify the words spoken by the first viewer. The media guidance application may further compare a tone of voice of the first viewer included in the voice input with a tone included in the audio signature templates. For example, the tone of voice of the first viewer included in the voice input may indicate what word or words the first viewer is emphasizing in the voice input, and the media guidance application may determine, based on matching the tone of voice of the first viewer in the voice input with a tone included in the audio signature templates, which word or words the first viewer is emphasizing in the voice input. The media guidance application may then determine an intent of the voice input based on the word or words emphasized by the first viewer. For example, the media guidance application may determine that the intent of the voice input indicates that the voice input is a request for clarification, as opposed to an exclamation or reaction from the first viewer watching the live tennis match.

In some embodiments, each respective template of the plurality of audio signature templates corresponds to a respective plurality of keywords, and the media guidance application may attempt to match the audio signature corresponding to each of the words spoken by the first viewer with the audio signature templates corresponding to the plurality of keywords. For example, each respective keyword of the plurality of keywords may be associated with a request for clarification regarding the aspect of the segment of the live video about which the first viewer is confused, and the media guidance application may identify the first viewer's request for clarification regarding the aspect of the live video about which the first viewer is confused based on the keywords matching the words included in the voice input received from the first viewer. In the aforementioned example, the media guidance application may identify that the first viewer is confused about why the last ball was not called out by matching keywords, such as "why," "last," "ball," "not," and/or "called out," to the voice input received from the first viewer.

In some embodiments, the media guidance application may determine that the words and the tone of voice of the first viewer included in the audio signature match the words and the tone included in the respective template. For example, the media guidance application may compare both the words and the tone of voice included in the audio signature with the words and tone included in the audio signature templates, and identify, based on the comparison, the words that the first viewer has spoken and which words the first viewer emphasized in the voice input. In the aforementioned example, the first viewer may be emphasizing the word "out" in the voice input, and the media guidance application may determine, based on the tone of voice (e.g., the emphasis on the word "out") that the user is confused about why the last ball played in the live tennis match was not called out, as opposed to, for example, the first viewer merely questioning the decision.

In some embodiments, the media guidance application may identify the aspect for which the first viewer is requesting clarification, that is, the aspect about which the first viewer is confused, based on the respective keywords corresponding to the respective template that has an audio signature matching the audio signature of the voice input received from the first viewer. For example, the media guidance application may identify what the first viewer is confused about based on the keywords corresponding to the words spoken by the first viewer.

In some embodiments, the media guidance application may receive audio including a conversation between at least two viewers of the plurality of viewers. For example, two or more viewers may be watching the live tennis match at the same location, and the two or more viewers may be engaged in a conversation while watching the live tennis match. The media guidance application may receive, via a user device, the conversation as voice input from the two or more viewers. The media guidance application may process the voice input received from the two or more viewers to identify voice input from the first viewer and voice input from the second viewer participating in the conversation. For example, the media guidance application may separate words spoken by the first viewer from words spoken by the second viewer, and may separately determine what each of the two viewers is saying. In some embodiments, the media guidance application may determine, based on the words spoken by the first viewer, that the first viewer is confused about an aspect of the live tennis match. The media guidance application may further determine, based on the words spoken by the second viewer, that the second viewer is also confused about the same aspect of the live tennis match. For example, the media guidance application may receive input from the first viewer asking "Why was that last ball not called out?" and may receive additional input from the second viewer saying "I don't know either." Based on this exchange, the media guidance application may determine that both the first viewer and the second viewer are confused as to the reason why the last ball played was not called out.

In some embodiments, the guidance application may determine, based on the input received from the first viewer and the input received from the second viewer, that only one of the two viewers is confused about an aspect of the live video. For example, the media guidance application may determine, based on the words spoken by the first viewer, that the first viewer is confused as to why the last ball played was not called out. The media guidance application may further determine, based on words spoken by the second viewer, that the second viewer is not confused as to why the last ball played was not called out. For example, the media guidance application may receive input from the first viewer asking "Why was that last ball not called out?" and may receive additional input from the second viewer saying "I think the linesperson missed it." Based on this exchange, the media guidance application may determine that the first viewer would like to receive clarification as to why the last ball was not called out, but the second viewer may not be interested in receiving the clarification.

In some embodiments, the media guidance application may identify the segment corresponding to the input. For example, when the media guidance application receives input from the first viewer requesting clarification regarding an aspect of the live tennis match, the media guidance application may determine the segment of the live tennis match for which the first viewer is requesting clarification. In some embodiments, the media guidance application determines that the input received from the first viewer includes a keyword referencing a past occurrence, and may then determine, based on the keyword, that the first viewer is requesting clarification regarding the segment of the live video that was played back immediately before the media guidance application received the input from the first viewer. In some embodiments, the media guidance application may determine whether the keyword included in the input received from the first viewer matches a keyword corresponding to the segment of the live video played back immediately before the input from the first viewer was received. For example, the media guidance application may receive input from the first viewer saying "Why was that last ball not called out?" The media guidance application may then determine, based on the input including the keyword "last," that the first viewer is referring to the segment of the live tennis match that was played back immediately before the media guidance application received the input from the first viewer.

In some embodiments, the media guidance application may determine whether the input received from the first viewer includes a keyword referencing an ongoing occurrence, and may then determine, based on the keyword, that the first viewer is requesting clarification regarding the segment of the live video that was being played back when the media guidance application received the input from the first viewer. In some embodiments, the media guidance application may determine whether the keyword included in the input received from the first viewer matches a keyword corresponding to the segment of the live video played back when the input from the first viewer was received. For example, the media guidance application may receive input from the first viewer saying "Why does Roger keep hitting the ball to Rafa's forehand?" and may determine, based on the input including the phrase "keep hitting" that the first viewer is referring to an ongoing occurrence. The media guidance application may then determine, based on the determination that the first viewer is referring to an ongoing occurrence, that the first viewer is referring to the segment of the live tennis match that was played back when the media guidance application received the input from the first viewer.

In some embodiments, the media guidance application may identify a plurality of videos generated by other viewers of the plurality of viewers to whom the live video is transmitted. For example, the media guidance application may search for all videos being generated by the other viewers of the plurality of viewers while the other viewers are watching the live tennis match. In some embodiments, the plurality of videos identified by the media guidance application include a video component including the segment of the live video that includes the aspect about which the first viewer is confused, and also include an audio component including a plurality of words. For example, each of the plurality of videos identified by the media guidance application may include a video portion (e.g., the segment of the live tennis match about which the first viewer is confused) and an audio portion (e.g., voice commentary and/or other explanatory audio). In some embodiments, the video component of the plurality of videos identified by the media guidance application may include additional graphics generated by the other viewers. For example, the additional graphics may include markup or other explanatory graphics used to explain the aspect about which the first viewer is confused. In some embodiments, the media guidance application may identify textual and/or graphical explanatory commentary in addition to or instead of the plurality of videos. For example, the media guidance application may identify textual commentary (e.g., social media posts and/or other online commentary) and/or graphical commentary (e.g., drawings, images, markups, etc.) generated by the other viewers of the plurality of viewers to whom the live video is transmitted.

In some embodiments, the media guidance application identifies the plurality of words included in the audio component of each of the plurality of videos. For example, the media guidance application may generate an audio signature corresponding to each of the words included in the audio component of each of the plurality of videos. The media guidance application may further compare the audio signature corresponding to each of the words included in the audio component of each of the plurality of videos with audio signature templates stored in a database. Based on the comparison, the media guidance application may determine that the audio signatures corresponding to at least some of the words match the audio signature templates, and may thereby identify the words included in the audio component of each of the plurality of videos.

In some embodiments, the media guidance application may identify the plurality of words included in the audio component of each of the plurality of videos based on metadata associated with each of the plurality of videos. For example, the metadata may define or otherwise describe the plurality of words, and the media guidance application may identify the plurality of words based on the definition or description in the metadata.

In some embodiments, the media guidance application may compare the plurality of words included in the audio component of each of the plurality of videos with words associated with the aspect about which the first viewer is confused. The media guidance application may compare the words included in the audio component of each of the plurality of videos with keywords that define the aspect. For example, the media guidance application may determine that the keywords "why," "last," "ball," "not," and "called out" are associated with the aspect, and may then compare the words included in the audio component of each of the plurality of videos with the keywords. The media guidance application may then identify, based on the comparison, a subset of the plurality of videos where the audio component relates to the aspect. For example, the media guidance application may identify a subset of videos where the audio component (e.g., explanatory commentary) relates to the keywords "why," "last," "ball," "not," and "called out."

In some embodiments, the media guidance application may compare a preference of the first viewer to an attribute associated with the subset of the plurality of videos. For example, the media guidance application may retrieve one or more preferences associated with the first viewer, such as from a viewer profile. The preferences associated with the first viewer may include a preference for a particular other viewer whose videos the first viewer wants to watch, a preference for videos that include explanatory graphics, a preference for videos including explanatory commentary in a particular language, etc. The media guidance application may further retrieve one or more attributes associated with each video from metadata associated with the video. The attributes may include characteristics of the associated video, such as the name of the other viewer who generated the video, whether the video includes explanatory graphics, a language of the explanatory commentary included in the video, etc. The media guidance application may then compare the preference with an attribute associated with the videos to determine whether the preference of the first viewer matches the attribute associated with the videos. For example, the first viewer may have a preference for a particular other viewer's videos, and the metadata associated with each of the videos may indicate which other viewer is generating the video. The media guidance application may then compare the first viewer's preference for the particular other viewer's videos with the metadata indicating which other viewer is generating each of the videos.

In some embodiments, the media guidance application may further compare a preference of the second viewer to the attribute associated with the subset of the plurality of videos. For example, the media guidance application may retrieve one or more preferences associated with the second viewer and compare the preference of the second viewer with the attribute associated with the videos.

In some embodiments, the media guidance application generates a list of the videos included in the subset of the plurality of videos. The media guidance application may further order or sort based on a degree of matching of the preference of the first viewer or the preference of the second viewer to the attribute associated with the videos. For example, the media guidance application may generate a list of the videos and determine a degree of matching between the attribute associated with each of the videos and the preference of the first viewer. In some embodiments, the preference of the first viewer may be one of multiple preferences, and the media guidance application may further order the list of videos based on a number of the preferences of the first viewer that match one or more attributes associated with the videos. In some embodiments, the preferences of the first viewer are prioritized, and the media guidance application may further order the list of videos based on the priority of the preference of the first viewer that matches the attribute associated with the videos.

In some embodiments, the media guidance application may identify, based on the list, the video of the subset of the plurality of videos with the highest degree of matching of the preference of the first viewer to the attribute. For example, the media guidance application may identify the video with the highest degree of matching based on the order of the videos in the list.

In some embodiments, the media guidance application may select a video of the subset of the plurality of videos based on the comparison of the preference of the first viewer to the attribute associated with the videos. For example, the media guidance application may select the video with the highest degree of matching and/or the highest number of preferences of the first viewer matching attributes associated with the videos.

In some embodiments, the media guidance application determines whether the preference of the first viewer matches the preference of the second viewer. For example, the media guidance application may compare the preference of the first viewer and the preference of the second viewer and determine whether both the first viewer and the second viewer have a preference for videos generated by a particular other viewer.

The media guidance application may then select the video of the subset of videos based on the preference of the first viewer and the preference of the second viewer. For example, if the media guidance application determines that both the first viewer and the second viewer have a preference for videos generated by a particular other viewer, the media guidance application may select the video generated by the particular other viewer.

In some embodiments, the media guidance application plays back the selected video to the first viewer. For example, the media guidance application may generate for display the selected video to be displayed as an overlay or picture-in-picture over the live video. In some embodiments, the media guidance application plays back the selected video on a personal device of the first viewer. For example, the media guidance application may generate for display the selected video to be displayed on a smartphone or tablet computer associated with the first viewer.

In some embodiments, the media guidance application receives, after playback of the selected video, additional input from the first viewer. For example, after the selected video is played back, the media guidance application may receive additional voice input from the first viewer indicating that the first viewer is still confused about the aspect. In the aforementioned example, the first viewer may say, after the selected video is played back "I still don't understand. Why does it matter if the ball clipped the net?" The media guidance application may then identify, based on the additional input, a request for further clarification regarding the aspect of the segment of the live video. For example, the media guidance application may determine that the additional input received from the first viewer indicates that the first viewer is still confused about the aspect.

In some embodiments, the media guidance application may then identify a specification of a portion of the aspect for which the first viewer is requesting clarification. For example, the media guidance application may determine, based on the additional input from the first viewer specifying that the first viewer does not understand why it matters that the ball clipped the net, that the first viewer is requesting clarification regarding the relevance of the net to the ball not being called out.

In some embodiments, the media guidance application may further identify, based on the specification, a second subset of the plurality of videos. For example, the media guidance application may identify videos from the plurality of videos where an audio component of each of the videos relates to the net being relevant to the ball not being called out.

In some embodiments, the media guidance application may compare the preference of the first viewer to one or more attributes associated with the second subset of the plurality of videos. For example, the media guidance application may retrieve and compare the preference of the first viewer to the attribute associated with the videos included in the second subset of the plurality of videos similar to the comparison of the preference of the first viewer to the attribute associated with the videos included in the first subset of the plurality of videos.

In some embodiments, the media guidance application may then select a video of the second subset of the plurality of videos based on the comparison. For example, the media guidance application may select the video with the highest degree of matching between the preference of the first viewer and the attribute associated with the videos.

The media guidance application may then play back the selected video from the second subset of the plurality of videos to the first viewer. For example, the media guidance application may play back the selected video as an overlay over the live video and/or to a personal device associated with the first viewer. In some embodiments, the media guidance application may pause playback of the live video while the selected video is played back. For example, the media guidance application may temporarily pause playback of the live video while the selected video is played back in order to avoid confusing the user by playing back two videos simultaneously.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are thus described for providing a viewer with relevant commentary for a live video, by playing back a video with explanatory commentary generated by another viewer while watching the same live event. For example, a media guidance application may determine, based on input provided by the viewer, that the viewer is requesting clarification regarding an aspect (e.g., a history, a context, a play, a score, a player, a strategy, etc.) of the live event. In an example, the viewer is watching a live broadcast of a tennis match, and the viewer is confused as to why a particular ball played was not called out. For example, the viewer may ask "Why was that last ball not called out?" The media guidance application may then determine that the viewer is confused about why the last ball played in the live tennis match was not called out, and may identify videos generated by other viewers of the live tennis match who are providing commentary on the tennis match and determine whether the commentary explains the aspect regarding which the viewer is confused. For example, the media guidance application may select a video generated by another viewer explaining that the ball was not called out because it clipped the net. The media guidance application may then play back to the viewer the video generated by the other viewer explaining the aspect regarding which the viewer is confused. As a result, the media guidance application may provide the viewer with explanatory commentary that is relevant to the actual live event that the viewer is watching, and not a general explanation regarding the event (e.g., regarding the rules of tennis), which may not explain the particular aspect about which the viewer is confused.

Figure 1:
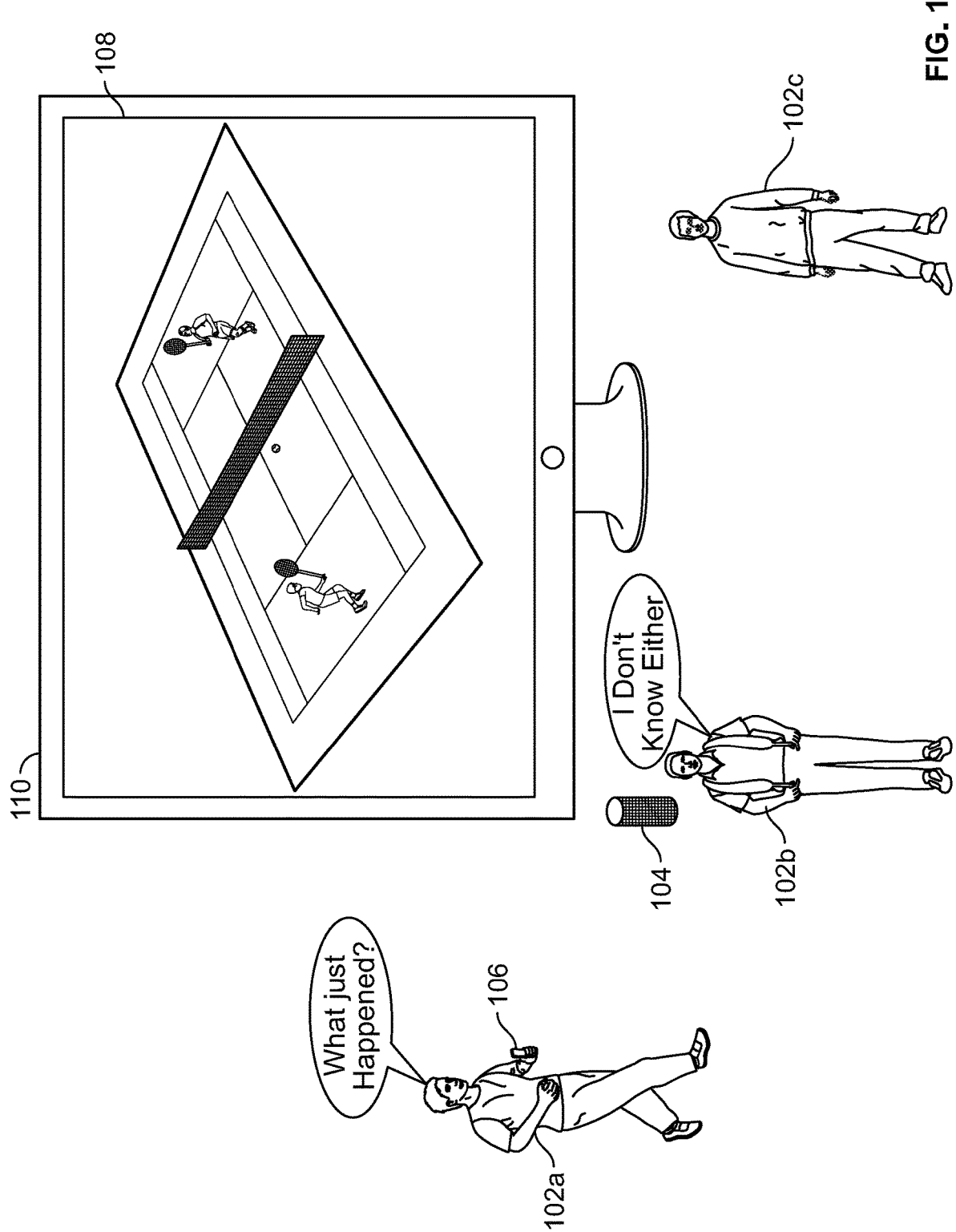
FIG. 1 shows an illustrative example of a scenario for providing a viewer with relevant commentary for a live video, in accordance with some embodiments of the disclosure.

FIG. 1 shows an illustrative example of a scenario 100 for providing a viewer with relevant commentary for a live video, in accordance with some embodiments of the disclosure. In scenario 100, a media guidance application may play back a live video 108 simultaneously to a plurality of viewers. For example, the media guidance application may play back a live transmission, such as a live stream, broadcast, narrowcast, direct feed, etc., of a live tennis match that is received from a content provider. The media guidance application may play back the live video 108 at a predetermined transmission start time. For example, the media guidance application may play back the live tennis match at a scheduled broadcast start time.

In some embodiments, the media guidance application may receive, during playback of the live video 108, input from a first viewer 102a of the plurality of viewers. The media guidance application may receive input including a reference to an aspect of a segment of the live video 108. For example, the first viewer 102a may be confused about an aspect of the live tennis match, and may provide input to the media guidance application requesting clarification regarding the aspect about which the first viewer 102a is confused. In the example, the media guidance application may determine that the first viewer 102a of a live broadcast of a tennis match is confused about a rule of the sport, a strategy employed by a player, a call made by a referee or umpire, a scoring mechanism, etc., (for example, why a particular ball played was not called out). The media guidance application may detect a query from the first viewer 102a asking "Why was that last ball not called out?"

In some embodiments, the media guidance application may receive the voice input from the first viewer 102a via a microphone associated with a user device 104 on which the media guidance application is executing, a user equipment 110 on which the media guidance application is playing back the live video 108, and/or a user equipment 106 associated with the user device 104 on which the media guidance application is executing or the user equipment 110 on which the live video 108 is played back. In some embodiments, some or all of the aforementioned user devices may be combined in a single user device. For example, the media guidance application may receive the input via a microphone included in a user device that is associated with a television on which the live video 108 is being played back. In some embodiments, the user device is a continuous-listening device.

In some embodiments, in response to receiving the voice input from the first viewer 102a, the media guidance application may generate an audio signature based on the voice input received from the first viewer 102a. For example, the media guidance application may process the voice input received from the first viewer 102a to isolate words spoken by the first viewer 102a from background noise, and may generate an audio signature, such as an acoustic fingerprint, corresponding to each of the words spoken by the first viewer 102a.

In some embodiments, the media guidance application may then compare the audio signature with a plurality of audio signature templates stored in a database. For example, the media guidance application may compare the audio signature corresponding to each of the words spoken by the first viewer 102a with the audio signature templates stored in the database in order to identify the words spoken by the first viewer 102a. The media guidance application may further compare a tone of voice of the first viewer 102a included in the voice input with a tone included in the audio signature templates. In an example, the media guidance application may perform digital signal processing on the audio signatures corresponding to each of the words spoken by the first viewer 102a, and each of the audio signature templates stored in the database. For example, the media guidance application may perform frequency analysis, peak volume detection, wave form matching, audio hashing, perceptual hashing, and/or any other digital signal processing method for determining whether an audio signature matches a template known to those skilled in the art. For example, the tone of voice of the first viewer 102a included in the voice input may indicate what word or words the first viewer 102a is emphasizing in the voice input, and the media guidance application may determine, based on matching the tone of voice of the first viewer 102a in the voice input with a tone included in the audio signature templates, which word or words the first viewer 102a is emphasizing in the voice input. The media guidance application may then determine an intent of the voice input based on the word or words emphasized by the first viewer 102a. For example, the media guidance application may determine that the intent of the voice input indicates that the voice input is a request for clarification, as opposed to an exclamation or reaction to the first viewer 102a watching the live tennis match.

In some embodiments, each respective template of the plurality of audio signature templates corresponds to a respective plurality of keywords, and the media guidance application may attempt to match the audio signature corresponding to each of the words spoken by the first viewer 102a with the audio signature templates corresponding to the plurality of keywords. For example, each respective keyword of the plurality of keywords may be associated with a request for clarification regarding the aspect of the segment of the live video 108 about which the first viewer 102a is confused, and the media guidance application may identify the first viewer's request for clarification regarding the aspect of the live video 108 about which the first viewer 102a is confused based on the keywords matching the words included in the voice input received from the first viewer 102a. In the aforementioned example, the media guidance application may identify that the first viewer 102a is confused about why the last ball was not called out by matching keywords, such as "why," "last," "ball," "not," and/or "called out," to the voice input received from the first viewer 102a.

In some embodiments, the media guidance application may determine that the words and the tone of voice of the first viewer 102a included in the audio signature match the words and the tone included in the respective template. For example, the media guidance application may compare both the words and the tone of voice included in the audio signature with the words and tone included in the audio signature templates, and identify, based on the comparison, the words that the first viewer 102a has spoken and which words the first viewer 102a emphasized in the voice input. In the aforementioned example, the first viewer 102a may be emphasizing the word "out" in the voice input, and the media guidance application may determine, based on the tone of voice (e.g., the emphasis on the word "out") that the first viewer 102a is confused about why the last ball played in the live tennis match was not called out, as opposed to, for example, the first viewer 102a merely questioning the decision.

In some embodiments, the media guidance application may identify the aspect for which the first viewer 102a is requesting clarification, that is, the aspect about which the first viewer 102a is confused, based on the respective keywords corresponding to the respective template that has an audio signature matching the audio signature of the voice input received from the first viewer 102a. For example, the media guidance application may identify what the first viewer 102a is confused about based on the keywords corresponding to the words spoken by the first viewer 102a.

In some embodiments, the media guidance application may receive audio including a conversation between at least two viewers of the plurality of viewers. For example, two or more viewers may be watching the live tennis match at the same location, and the two or more viewers may be engaged in a conversation while watching the live tennis match. The media guidance application may receive, via a user device, the conversation as voice input from the two or more viewers. The media guidance application may process the voice input received from the two or more viewers to identify voice input from the first viewer 102a and voice input from a second viewer 102b participating in the conversation. For example, the media guidance application may separate words spoken by the first viewer 102a from words spoken by the second viewer 102b, and may separately determine what each of the two viewers is saying. In some embodiments, the media guidance application may determine, based on the words spoken by the first viewer 102a, that the first viewer 102a is confused about an aspect of the live tennis match. The media guidance application may further determine, based on the words spoken by the second viewer 102b, that the second viewer 102b is also confused about the aspect of the live tennis match. For example, the media guidance application may receive input from the first viewer 102a asking "Why was that last ball not called out?" and may receive additional input from the second viewer 102b saying "I don't know either." Based on this exchange, the media guidance application may determine that both the first viewer 102a and the second viewer 102b are confused as to the reason why the last ball played was not called out.

In some embodiments, the guidance application may determine, based on the input received from the first viewer 102a and the input received from the second viewer 102b, that only one of the two viewers is confused about an aspect of the live video 108. For example, the media guidance application may determine, based on the words spoken by the first viewer 102a, that the first viewer 102a is confused as to why the last ball played was not called out. The media guidance application may further determine, based on words spoken by the second viewer 102b, that the second viewer 102b is not confused as to why the last ball played was not called out. For example, the media guidance application may receive input from the first viewer 102a asking "Why was that last ball not called out?" and may receive additional input from the second viewer 102b saying "I think the linesperson missed it." Based on this exchange, the media guidance application may determine that the first viewer 102a would like to receive clarification as to why the last ball was not called out, but the second viewer 102b may not be interested in receiving the clarification.

In some embodiments, the media guidance application may identify the segment corresponding to the input. For example, when the media guidance application receives input from the first viewer 102a requesting clarification regarding an aspect of the live tennis match, the media guidance application may determine the segment of the live tennis match for which the first viewer 102a is requesting clarification. In some embodiments, the media guidance application determines that the input received from the first viewer 102a includes a keyword referencing a past occurrence, and may then determine, based on the keyword, that the first viewer 102a is requesting clarification regarding the segment of the live video 108 that was played back immediately before the media guidance application received the input from the first viewer 102a. In some embodiments, the media guidance application may determine whether the keyword included in the input received from the first viewer 102a matches a keyword corresponding to the segment of the live video 108 played back immediately before the input from the first viewer 102a was received. For example, the media guidance application may receive input from the first viewer 102a saying "Why was that last ball not called out?" The media guidance application may then determine, based on the input including the keyword "last," that the first viewer 102a is referring to the segment of the live tennis match that was played back immediately before the media guidance application received the input from the first viewer 102a.

In some embodiments, the media guidance application may determine whether the input received from the first viewer 102a match includes a keyword referencing an ongoing occurrence, and may then determine, based on the keyword, that the first viewer 102a is requesting clarification regarding the segment of the live video 108 that was being played back when the media guidance application received the input from the first viewer 102a. In some embodiments, the media guidance application may determine whether the keyword included in the input received from the first viewer 102a matches a keyword corresponding to the segment of the live video 108 played back when the input from the first viewer 102a was received. For example, the media guidance application may receive input from the first viewer 102a saying "why does Roger keep hitting the ball to Rafa's forehand?" and may determine, based on the input including the phrase "keep hitting" that the first viewer 102a is referring to an ongoing occurrence. The media guidance application may then determine, based on the determination that the first viewer 102a is referring to an ongoing occurrence, that the first viewer 102a is referring to the segment of the live tennis match that was played back when the media guidance application received the input from the first viewer 102a.

In some embodiments, the media guidance application may identify a plurality of videos generated by other viewers of the plurality of viewers to whom the live video 108 is transmitted. For example, the media guidance application may search for all videos being generated by the other viewers of the plurality of viewers while the other viewers are watching the live tennis match. In an example, the other viewers are generating live-stream videos of explanatory commentary they are providing regarding the live tennis match. In some embodiments, the plurality of videos identified by the media guidance application include a video component including the segment of the live video 108 which includes the aspect about which the first viewer 102a is confused, and also include an audio component including a plurality of words. For example, each of the plurality of videos identified by the media guidance application may include a video portion (e.g., the segment of the live tennis match about which the first viewer 102a is confused) and an audio portion (e.g., voice commentary and/or other explanatory audio). In some embodiments, the video component of the plurality of videos identified by the media guidance application may include additional graphics generated by the other viewers. For example, the additional graphics may include markup or other explanatory graphics used to explain the aspect about which the first viewer 102a is confused.

In some embodiments, the media guidance application identifies the plurality of words included in the audio component of each of the plurality of videos. For example, the media guidance application may generate an audio signature corresponding to each of the words included in the audio component of each of the plurality of videos. The media guidance application may further compare the audio signature corresponding to each of the words included in the audio component of each of the plurality of videos with audio signature templates stored in a database. Based on the comparison, the media guidance application may determine that the audio signatures corresponding to at least some of the words match the audio signature templates, and may thereby identify the words included in the audio component of each of the plurality of videos.

In some embodiments, the media guidance application may identify the plurality of words included in the audio component of each of the plurality of videos based on metadata associated with each of the plurality of videos. For example, the metadata may define or otherwise describe the plurality of words, and the media guidance application may identify the plurality of words based on the definition or description in the metadata.

In some embodiments, the media guidance application may compare the plurality of words included in the audio component of each of the plurality of videos with words associated with the aspect about which the first viewer 102a is confused. The media guidance application may compare the words included in the audio component of each of the plurality of videos with keywords that define the aspect. For example, the media guidance application may determine that the keywords "why," "last," "ball," "not," and "called out" are associated with the aspect, and may then compare the words included in the audio component of each of the plurality of videos with the keywords. The media guidance application may then identify, based on the comparison, a subset of the plurality of videos where the audio component relates to the aspect. For example, the media guidance application may identify a subset of videos where the audio component (e.g., explanatory commentary) relates to the keywords "why," "last," "ball," "not," and "called out."

In some embodiments, the media guidance application may compare a preference of the first viewer 102a to an attribute associated with the subset of the plurality of videos. For example, the media guidance application may retrieve one or more preferences associated with the first viewer 102a, such as from a viewer profile. The preferences associated with the first viewer 102a may include a preference for a particular other viewer whose videos the first viewer 102a wants to watch, a preference for videos that include explanatory graphics, a preference for videos including explanatory commentary in a particular language, etc. The media guidance application may further retrieve one or more attributes associated with each video from metadata associated with the video. The attributes may include characteristics of the associated video, such as the name of the other viewer who generated the video, whether the video includes explanatory graphics, a language of the explanatory commentary included in the video, etc. The media guidance application may then compare the preference of the first viewer 102a with the attribute associated with the videos to determine whether the preference of the first viewer 102a matches the attribute associated with the videos. For example, the first viewer 102a may have a preference for a particular other viewer's videos, and the metadata associated with each of the videos may indicate which other viewer is generating the video. The media guidance application may then compare the first viewer's preference for the particular other viewer's videos with the metadata indicating which other viewer is generating each of the videos.

In some embodiments, the media guidance application may further compare a preference of the second viewer 102b to the attribute associated with the subset of the plurality of videos. For example, the media guidance application may retrieve one or more preferences associated with the second viewer 102b and compare the preferences of the second viewer 102b with one or more attributes associated with the videos.

In some embodiments, the media guidance application generates a list of the videos included in the subset of the plurality of videos. The media guidance application may further order or sort based on a degree of matching of the preference of the first viewer 102a or the preference of the second viewer 102b to the attribute associated with the videos. For example, the media guidance application may generate a list of the videos and determine a degree of matching between the attribute associated with each of the videos and the preference of the first viewer 102a. In some embodiments, the preference of the first viewer 102a may include multiple preferences, and the media guidance application may further order the list of videos based on a number of the preferences of the first viewer 102a that match attributes associated with the videos. In some embodiments, the preferences of the first viewer 102a are prioritized, and the media guidance application may further order the list of videos based on the priority of the preferences of the first viewer 102a that match the attributes associated with the videos.

In some embodiments, the media guidance application may identify, based on the list, the video of the subset of the plurality of videos with the highest degree of matching of the preference of the first viewer 102a to the attribute. For example, the media guidance application may identify the video with the highest degree of matching based on the order of the videos in the list.

In some embodiments, the media guidance application may select a video of the subset of the plurality of videos based on the comparison of the preference of the first viewer 102a to the attribute associated with the videos. For example, the media guidance application may select the video with the highest degree of matching and/or the highest number of preferences of the first viewer 102a matching attributes associated with the videos.

In some embodiments, the media guidance application determines whether the preference of the first viewer 102a matches the preference of the second viewer 102b. For example, the media guidance application may compare the preference of the first viewer 102a and the preference of the second viewer 102b and determine whether both the first viewer 102a and the second viewer 102b have a preference for videos generated by a particular other viewer.

The media guidance application may then select the video of the subset of videos based on the preference of the first viewer 102a and the preference of the second viewer 102b. For example, if the media guidance application determines that both the first viewer 102a and the second viewer 102b have a preference for videos generated by a particular other viewer, the media guidance application may select the video generated by the particular other viewer.

In some embodiments, the media guidance application plays back the selected video to the first viewer 102a. For example, the media guidance application may generate for display the selected video to be displayed as an overlay or picture-in-picture over the live video 108. In some embodiments, the media guidance application plays back the selected video on a personal device of the first viewer 102a. For example, the media guidance application may generate for display the selected video to be displayed on a smartphone or tablet computer associated with the first viewer 102a.

In some embodiments, the media guidance application receives, in response to playback of the selected video, additional input from the first viewer 102a. For example, after the selected video is played back, the media guidance application may receive additional voice input from the first viewer 102a indicating that the first viewer 102a is still confused about the aspect. In the aforementioned example, the first viewer 102a may say, in response to the selected video being played back, "I still don't understand. Why does it matter if the ball clipped the net?" The media guidance application may detect the additional query from the first viewer 102a and then identify, based on the additional input, a request for further clarification regarding the aspect of the segment of the live video 108. For example, the media guidance application may determine that the additional input received from the first viewer 102a indicates that the first viewer 102a is still confused about the aspect.

In some embodiments, the media guidance application may then identify a specification of a portion of the aspect for which the first viewer 102a is requesting clarification. For example, the media guidance application may determine, based on the additional input from the first viewer 102a specifying that the first viewer 102a does not understand why it matters that the ball clipped the net, that the first viewer 102a is requesting clarification regarding the relevance of the net to the ball not being called out.

In some embodiments, the media guidance application may further identify, based on the specification, a second subset of the plurality of videos. For example, the media guidance application may identify videos from the plurality of videos where an audio component of each of the videos relates to the net being relevant to the ball not being called out.

In some embodiments, the media guidance application may compare the preference of the first viewer 102a to an attribute associated with the second subset of the plurality of videos. For example, the media guidance application may retrieve and compare the preference of the first viewer 102a to the attribute associated with the videos included in the second subset of the plurality of videos similar to the comparison of the preference of the first viewer 102a to the attribute associated with the videos included in the first subset of the plurality of videos.

In some embodiments, the media guidance application may then select a video of the second subset of the plurality of videos based on the comparison. For example, the media guidance application may select the video with the highest degree of matching between the preference of the first viewer 102a and the attribute associated with the videos.

The media guidance application may then play back the selected video from the second subset of the plurality of videos to the first viewer 102a. For example, the media guidance application may play back the selected video as an overlay over the live video 108 and/or to a personal device associated with the first viewer 102a. In some embodiments, the media guidance application may pause playback of the live video 108 while the selected video is played back. For example, the media guidance application may temporarily pause playback of the live video 108 while the selected video is played back in order to avoid confusing the user by playing back two videos simultaneously.

Figure 2:
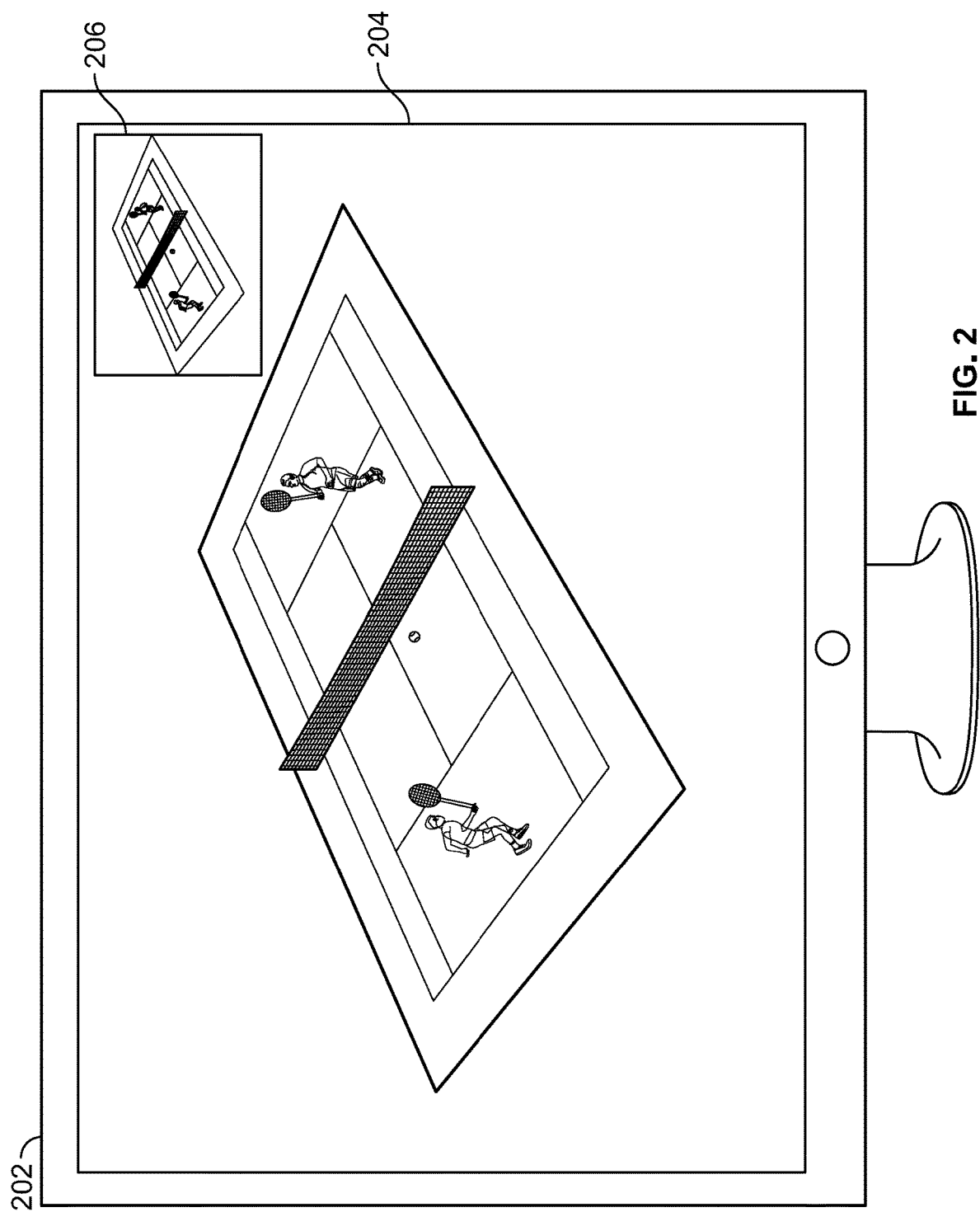
FIG. 2 shows an illustrative example of another scenario for providing a viewer with relevant commentary for a live video, in accordance with some embodiments of the disclosure.

FIG. 2 shows an illustrative example of a scenario 200 for providing a viewer with relevant commentary for a live video, in accordance with some embodiments of the disclosure. In scenario 200, the media guidance application may play back the live video 204 on a user device 202. The media guidance application may further play back the selected video 206 from the subset of the plurality of videos overlaid onto the live video 204, such as via a picture-in-picture window.

Figure 3:
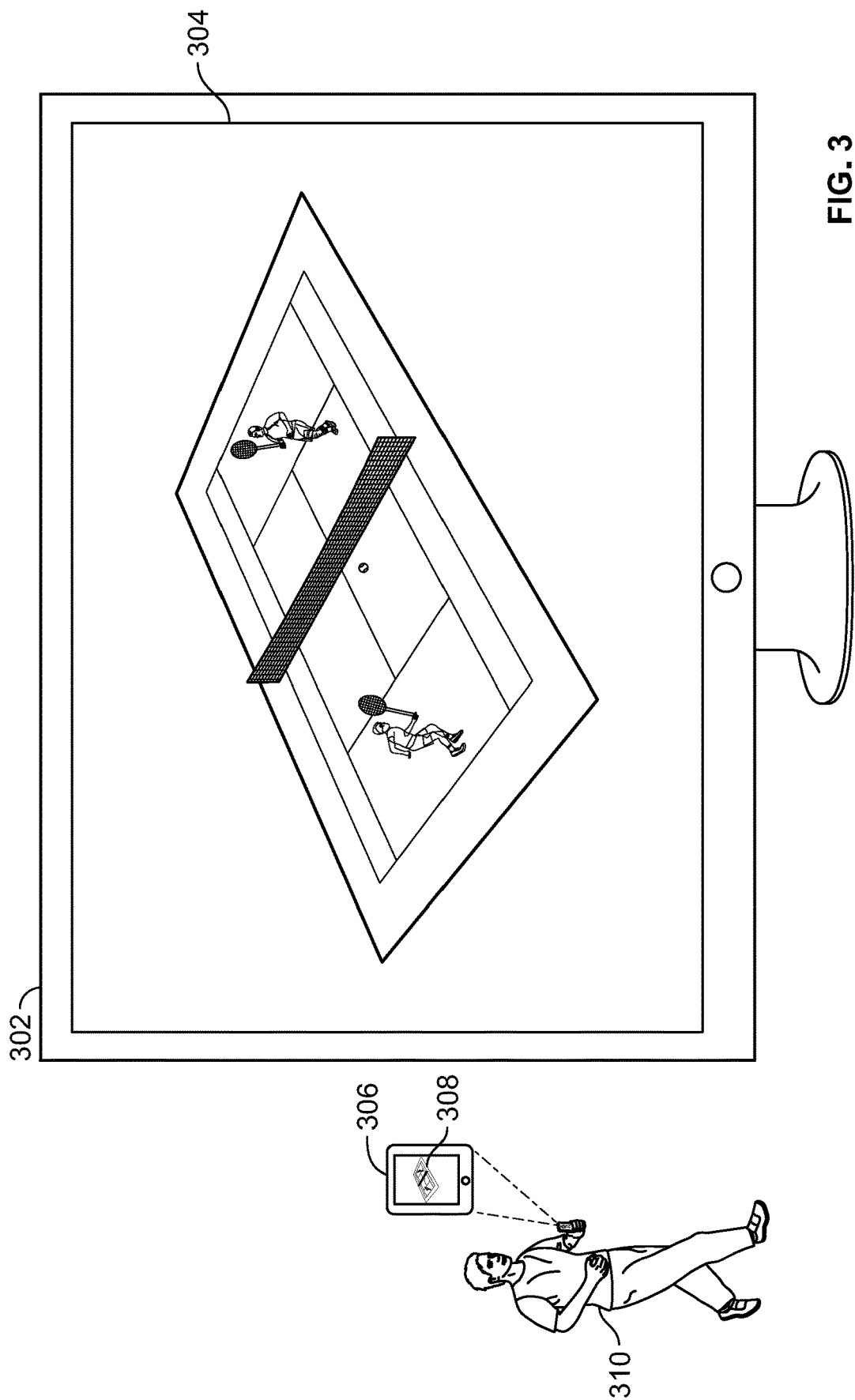
FIG. 3 shows an illustrative example of yet another scenario for providing a viewer with relevant commentary for a live video, in accordance with some embodiments of the disclosure.

FIG. 3 shows an illustrative example 300 for providing a viewer with relevant commentary for a live video, in accordance with some embodiments of the disclosure. In scenario 300, the media guidance application may play back the live video 304 on a user device 302. The media guidance application may further play back the selected video 308 from the subset of the plurality of videos on a personal device 306 associated with a first viewer 310 (e.g., the first viewer 102a).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
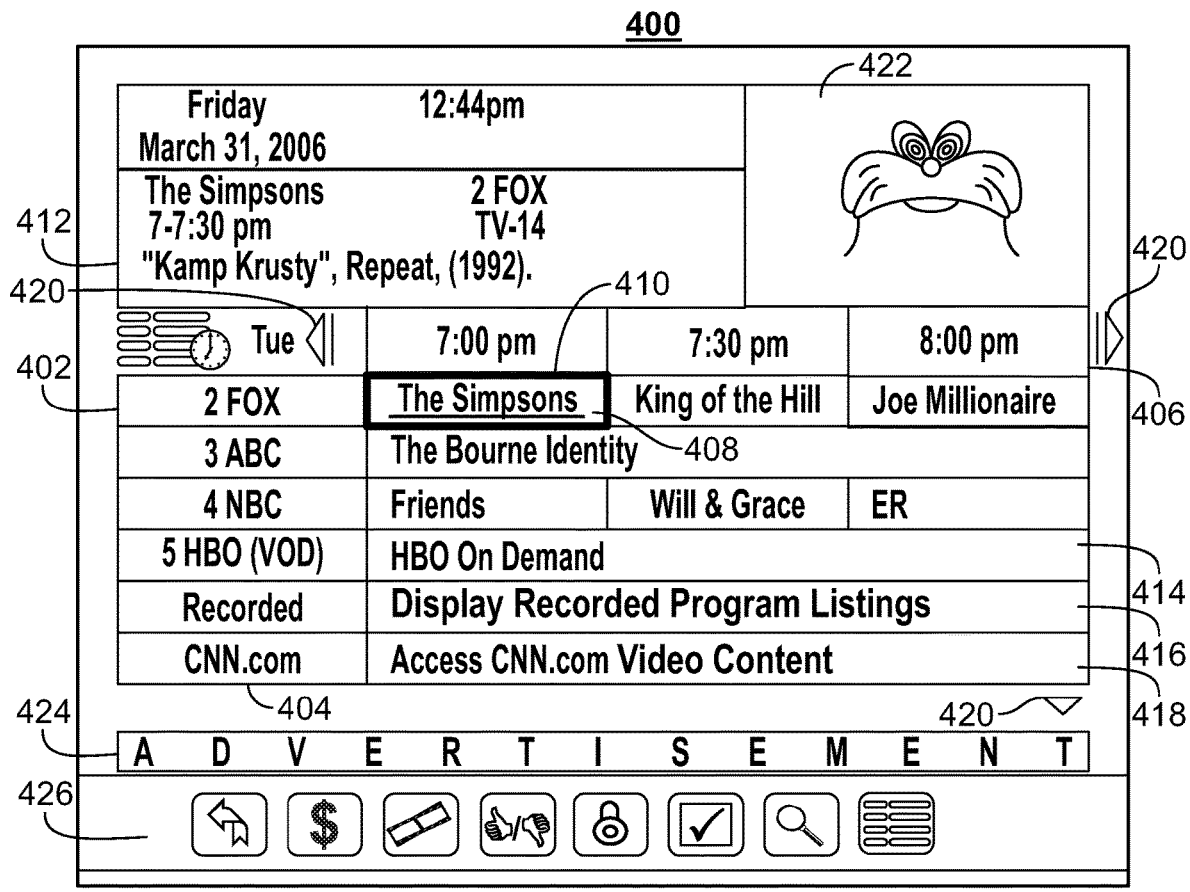
FIGS. 4 and 5 show illustrative examples of display screens generated by a media guidance application in accordance with some embodiments of the disclosure.
Figure 5:
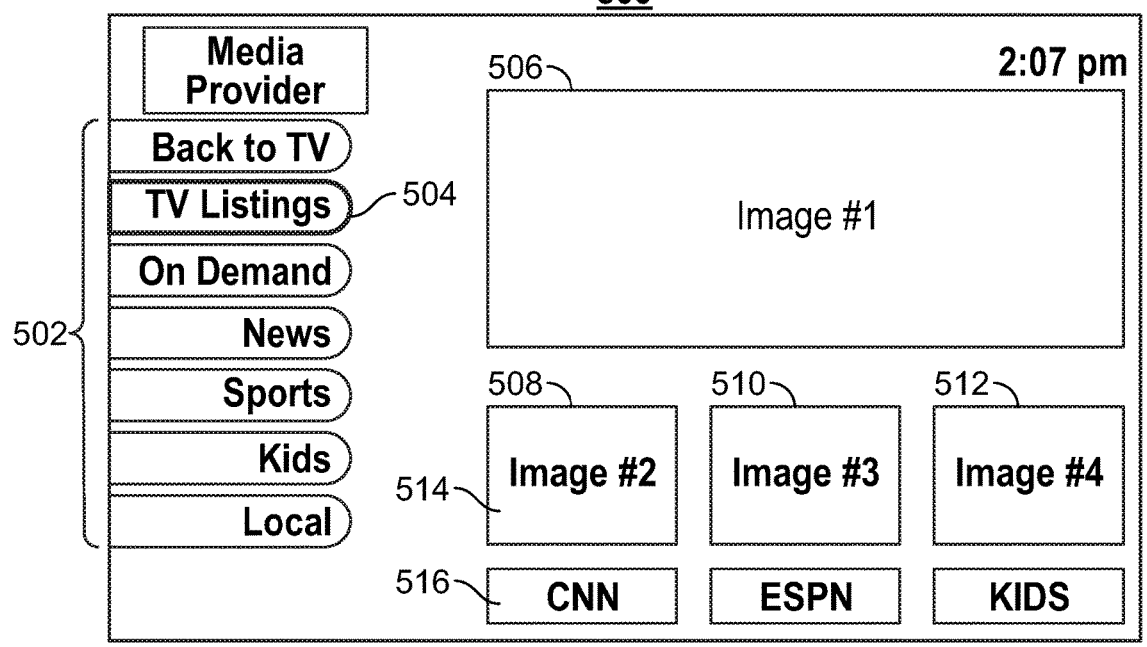

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows an illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
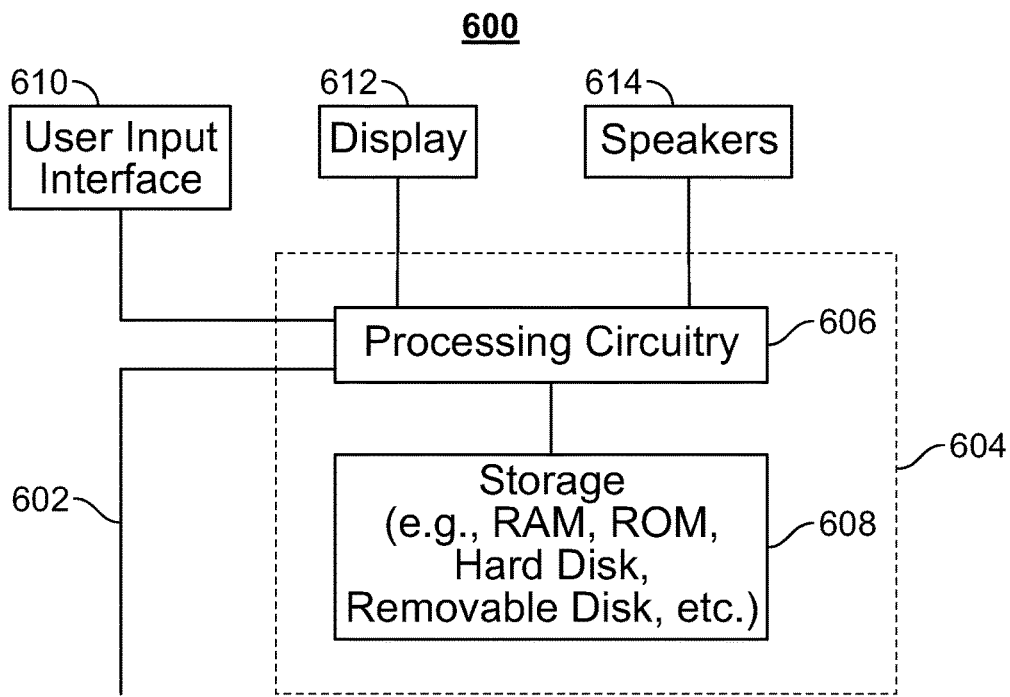
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
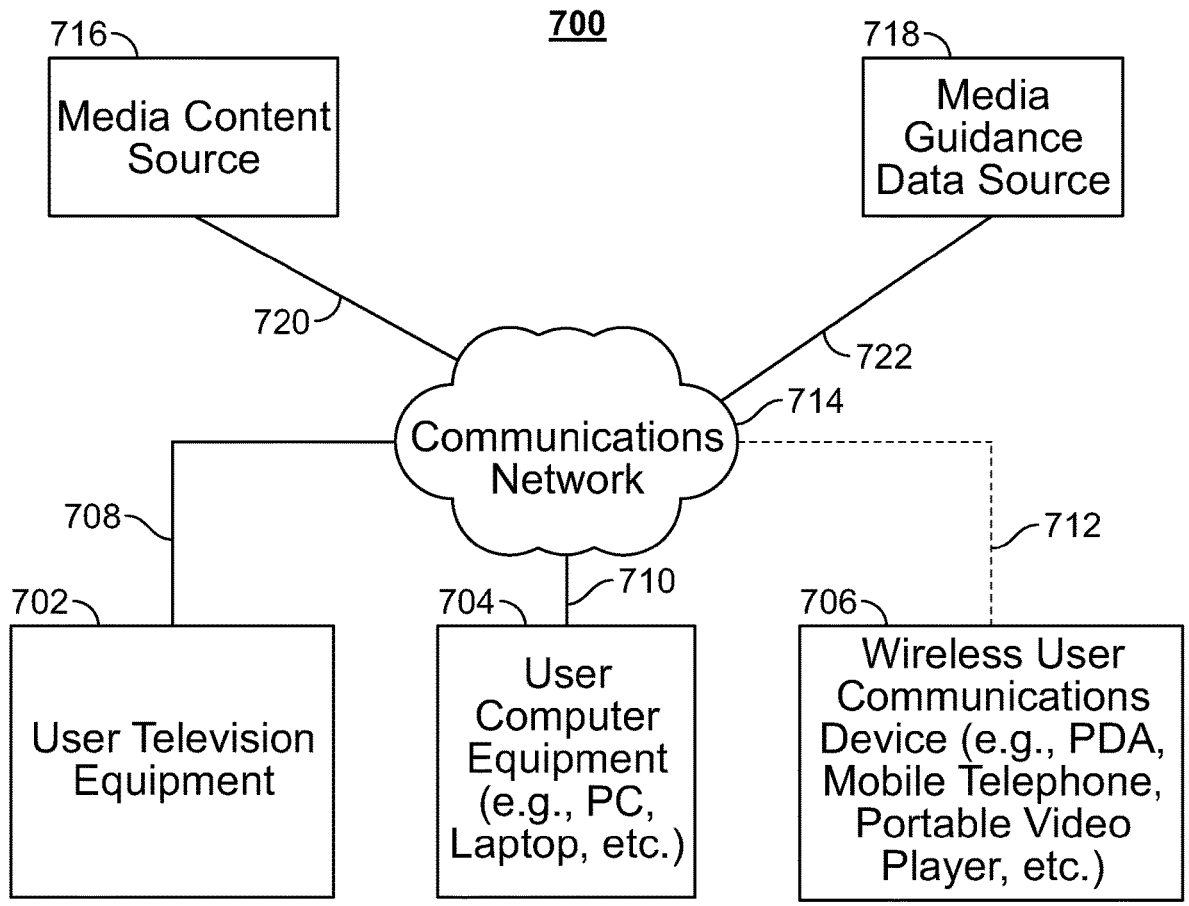
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
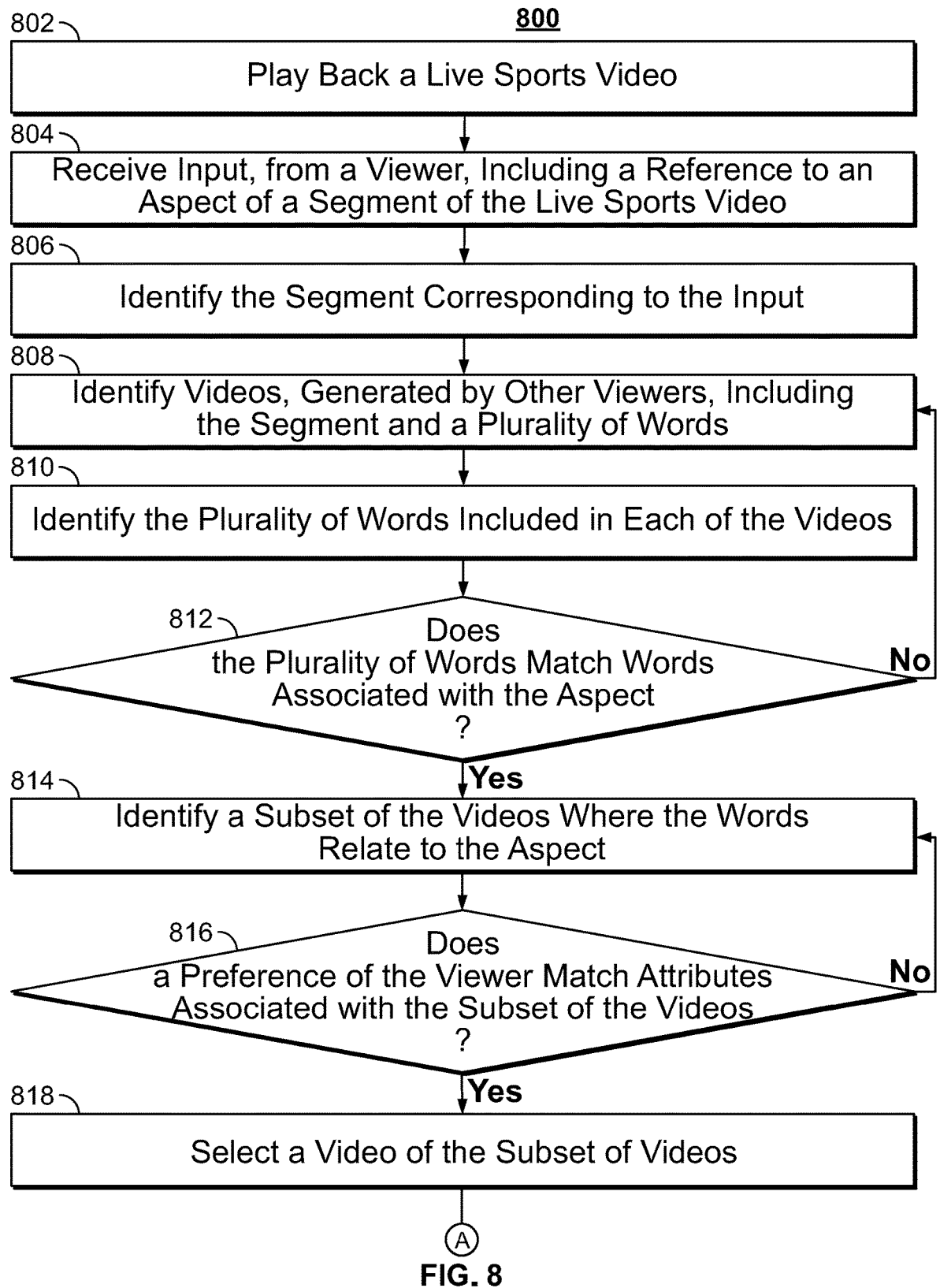
FIG. 8 is a flowchart of an illustrative process for providing a viewer with relevant commentary for a live video, in accordance with some embodiments of the disclosure.
Figure 8:
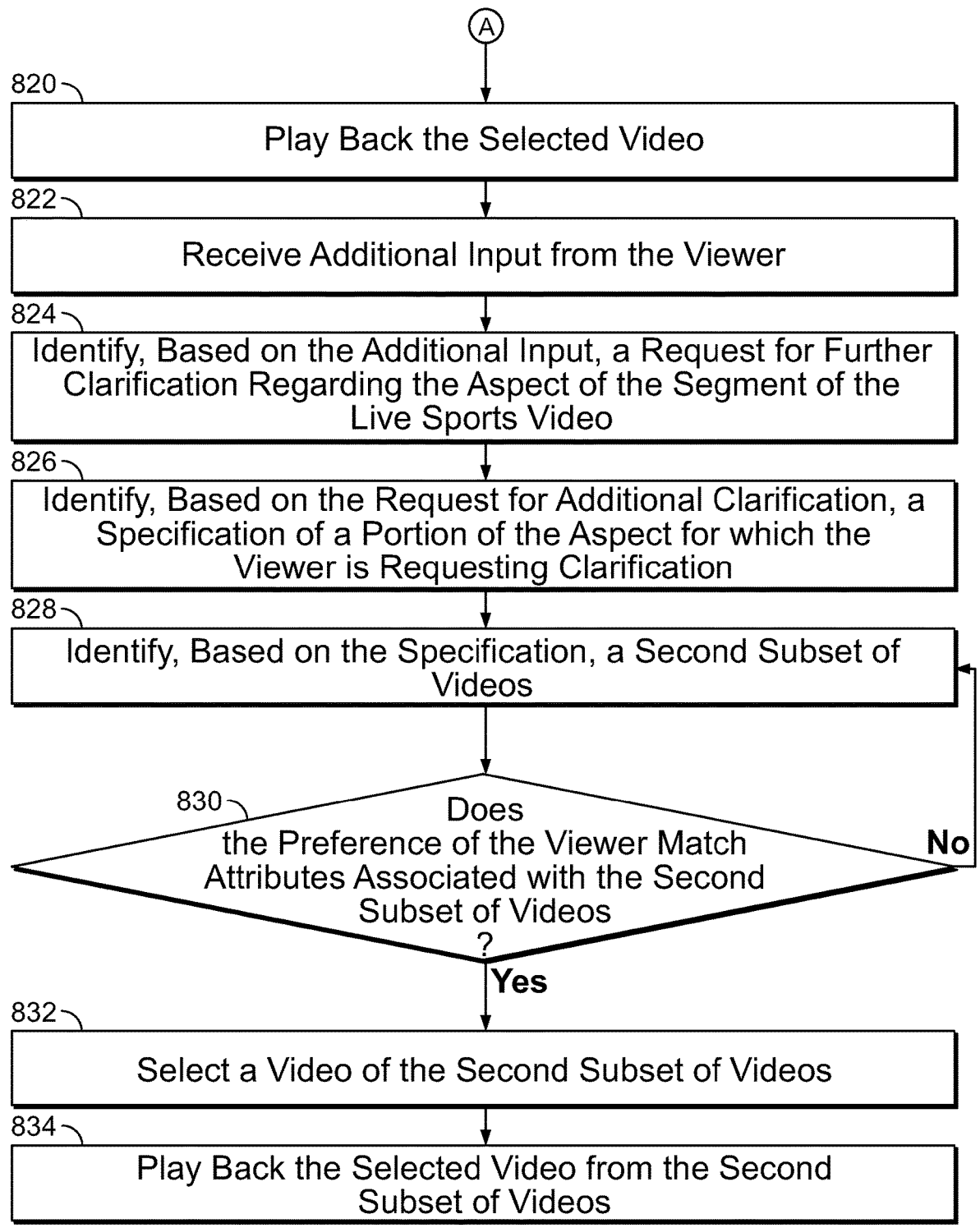

FIG. 8 is a flowchart of an illustrative process for providing a viewer with relevant commentary for a live video, in accordance with some embodiments of the disclosure. It should be noted that process 800 or any step thereof could be performed on, or provided by, any of the devices shown in FIGS. 1, 2, 3, 6, and 7. For example, process 800 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 800 may be incorporated into or combined with one or more steps of any other process or embodiment (e.g., as described in relation to FIGS. 9-15). Many elements of process 800 have been described above with respect to FIGS. 1, 2, and 3, and those descriptions have full force and effect with respect to the below description of process 800, and thus details on previously described elements are omitted for the sake of brevity.

At 802, control circuitry 604 plays back a live video 108 that is transmitted, at a transmission start time, simultaneously to a plurality of viewers (e.g., via display 612 and speaker 614). At 804, control circuitry 604 receives (e.g., via user input interface 610), during playback of the live video 108, input from a first viewer 102*a* of the plurality of viewers, the input including a reference to an aspect of a segment of the live video 108. At 806, control circuitry 604 identifies the segment corresponding to the input. At 808, control circuitry 604 identifies a plurality of videos generated by other viewers of the plurality of viewers, each of the plurality of videos comprising a video component including the segment and an audio component including a plurality of words. At 810, control circuitry 604 identifies the plurality of words included in the audio component of each of the plurality of videos. At 812, control circuitry 604 compares the plurality of words included in the audio component of each of the plurality of videos with words associated with the aspect to determine (e.g., based on processing circuitry 606 and storage 608) whether the plurality of words included in the audio component of each of the plurality of videos match the words associated with the aspect. In response to determining that the plurality of words included in the audio component of each of the plurality of videos do not match the words associated with the aspect, process 800 returns to step 808. In response to determining that the plurality of words included in the audio component of each of the plurality of videos match the words associated with the aspect, at step 814, control circuitry 604 identifies, based on the comparing, a subset of the plurality of videos where the audio component relates to the aspect. At 816, control circuitry 604 compares a preference of the first viewer 102*a* to an attribute associated with the subset of the plurality of videos to determine (e.g., based on processing circuitry 606 and storage 608) whether the preference of the first viewer 102*a* matches the attribute associated with the subset of the plurality of videos. In response to determining that the preference of the first viewer 102*a* does not match the attribute associated with the subset of the plurality of videos, process 800 returns to step 814. In response to determining that the preference of the first viewer 102*a* matches the attribute associated with the subset of the plurality of videos, at step 818, control circuitry 604 selects a video 206 of the subset of the plurality of videos based on the comparing. At 820, control circuitry 604 plays back the selected video 206 to the first viewer 102*a*. At 822, control circuitry 604 receives (e.g., via user input interface 610), in response to playback of the selected video 206, additional input from the first viewer 102*a*. At 824, control circuitry 604 identifies, based on the additional input, a request for further clarification regarding the aspect of the segment of the live video 108. At 826, control circuitry 604 identifies, based on the request for additional clarification, a specification of a portion of the aspect for which the first viewer 102*a* is requesting clarification. At 828, control circuitry 604 identifies, based on the specification, a second subset of the plurality of videos. At 830, control circuitry 604 compares the preference of the first viewer 102*a* to an attribute associated with the second subset of the plurality of videos to determine (e.g., based on processing circuitry 606 and storage 608) whether the preference of the first viewer 102*a* matches the attribute associated with the second subset of the plurality of videos. In response to determining that the preference of the first viewer 102*a* does not match the attribute associated with the second subset of the plurality of videos, process 800 returns to step 828. In response to determining that the preference of the first viewer 102*a* matches the attribute associated with the second subset of the plurality of videos, at step 832, control circuitry 604 selects a video of the second subset of the plurality of videos based on the comparison of the preference of the first viewer 102*a* to the attribute associated with the second subset of the plurality of videos. At step 834, control circuitry 604 plays back (e.g., via display 612 and speakers 614) the selected video from the second subset of the plurality of videos to the first viewer 102*a*.

Figure 9:
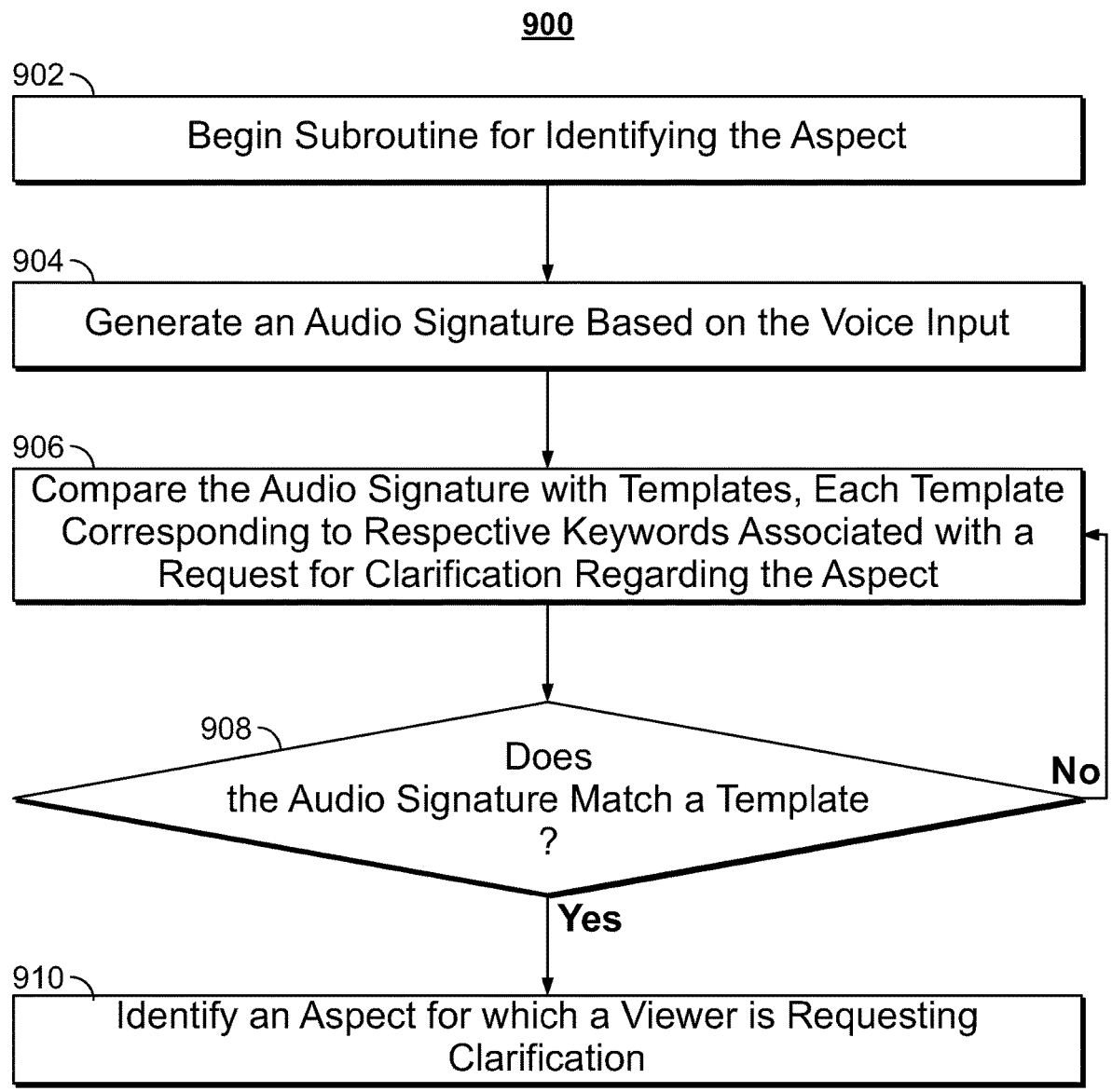
FIG. 9 is a flowchart of a detailed illustrative process for identifying an aspect of a segment of a live video for which a viewer is requesting clarification, in accordance with some embodiments of the disclosure.

FIG. 9 is a flowchart of a detailed illustrative process for identifying an aspect of a segment of a live video for which a viewer is requesting clarification, in accordance with some embodiments of the disclosure. It should be noted that process 900 or any step thereof could be performed on, or provided by, any of the devices shown in FIGS. 1, 2, 3, 6, and 7. For example, process 900 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 900 may be incorporated into or combined with one or more steps of any other process or embodiment (e.g., as described in relation to FIGS. 8 and 10-15). Many elements of process 900 have been described above with respect to FIGS. 1, 2, and 3, and those descriptions have full force and effect with respect to the below description of process 900, and thus details on previously described elements are omitted for the sake of brevity.

At 902, control circuitry 604 begins a subroutine for identifying the aspect. At 904, control circuitry 604 generates (e.g., based on processing circuitry 606 and storage 608) an audio signature based on the voice input received from the first viewer 102a. For example, control circuitry 604 may generate the audio signature by using digital signal processing to identify peak frequencies and/or a wave form corresponding to the received voice input. At 906, control circuitry 604 compares the audio signature with a plurality of templates stored in a database, each respective template of the plurality of templates corresponding to a respective plurality of keywords associated with a request for clarification regarding the aspect of the segment of the live video 108. For example, control circuitry 604 may compare words included in the audio signature to words included in the audio signature template. At 908, control circuitry 604 determines (e.g., based on processing circuitry 606 and storage 608) whether the audio signature matches a respective template. For example, control circuitry 604 may determine whether the words included in the audio signature match the words included in the audio signature template. In response to determining that the audio signature does not match the respective template, process 900 returns to step 906. In response to determining that the audio signature matches the respective template, at step 910, control circuitry 604 identifies, based on the respective keywords corresponding to the respective template, the aspect for which the first viewer 102a is requesting clarification.

Figure 10:
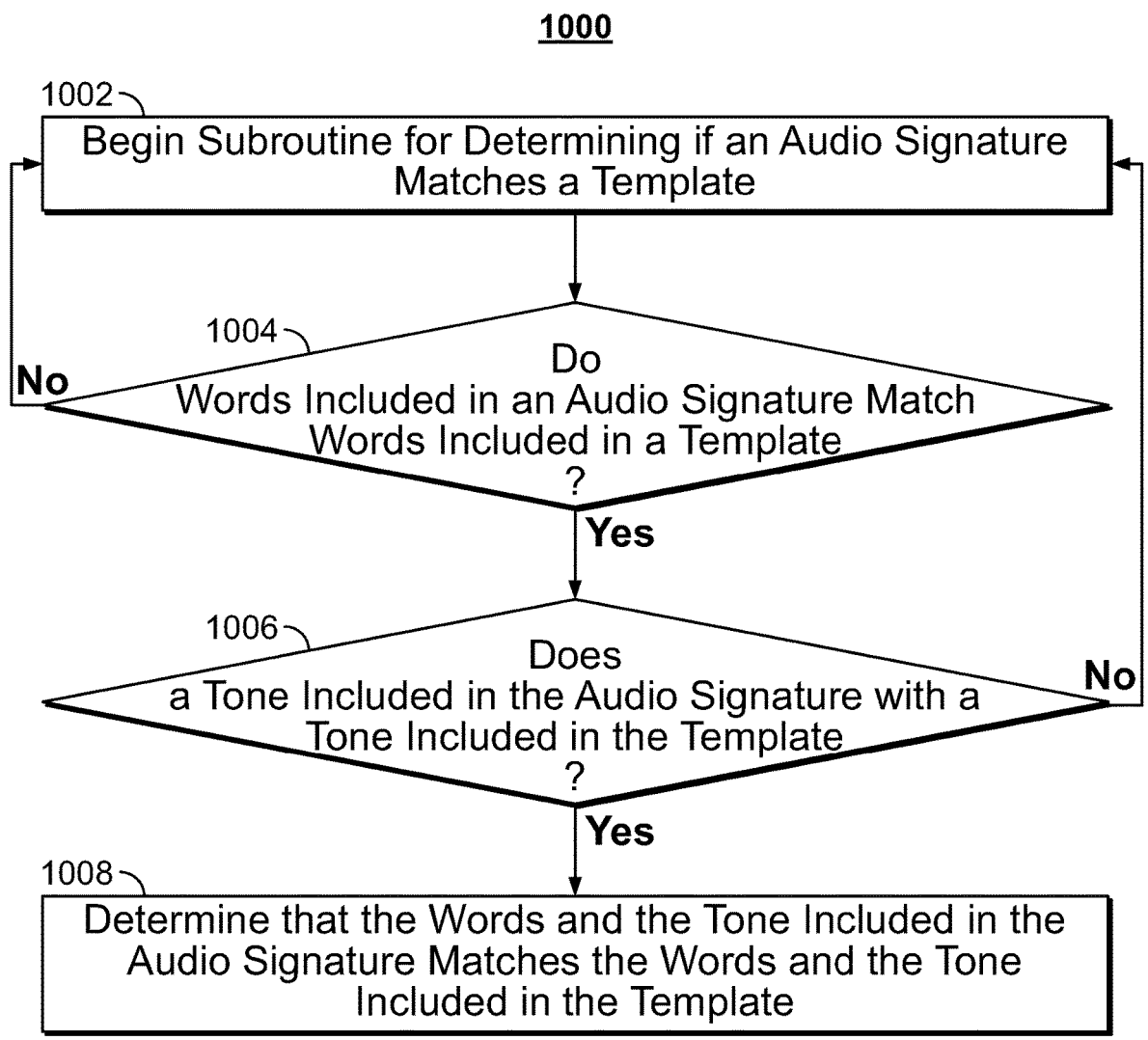
FIG. 10 is a flowchart of a detailed illustrative process for determining whether an audio signature matches a template, in accordance with some embodiments of the disclosure.

FIG. 10 is a flowchart of a detailed illustrative process for determining whether an audio signature matches a template, in accordance with some embodiments of the disclosure. It should be noted that process 1000 or any step thereof could be performed on, or provided by, any of the devices shown in FIGS. 1, 2, 3, 6, and 7. For example, process 1000 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1000 may be incorporated into or combined with one or more steps of any other process or embodiment (e.g., as described in relation to FIGS. 8, 9, and 11-15). Many elements of process 1000 have been described above with respect to FIGS. 1, 2, and 3, and those descriptions have full force and effect with respect to the below description of process 1000, and thus details on previously described elements are omitted for the sake of brevity.

At 1002, control circuitry 604 begins a subroutine for determining if an audio signature matches a template. At 1004, control circuitry 604 compares words included in the audio signature with words included in the respective template to determine (e.g., based on processing circuitry 606 and storage 608) whether the words included in the audio signature match words included in the respective template. For example, control circuitry 604 may perform digital signal processing to match peak frequencies and/or wave forms corresponding to the words included in the audio signatures to peak frequencies and/or wave forms indicated in the audio signature templates. In response to determining that the words included in the audio signature do not match words included in the respective template, process 1000 returns to step 1002. In response to determining that the words included in the audio signature match the words included in the template, at step 1006, control circuitry compares a tone included in the audio signature with a tone included in the respective template to determine (e.g., based on processing circuitry 606 and storage 608) whether a tone included in the audio signature matches a tone included in the respective template. For example, control circuitry 604 may perform digital signal processing to match peak frequencies and/or wave forms corresponding to a tone of the words included in the audio signatures to peak frequencies and/or wave forms indicated in the audio signature templates. In response to determining that the tone included in the audio signature does not match the tone included in the respective template, process 1000 returns to step 1002. In response to determining that the tone included in the audio signature matches the tone included in the respective template, at step 1008, control circuitry 604 determines (e.g., based on processing circuitry 606 and storage 608) that the words and the tone included in the audio signature match the words and the tone included in the respective template.

Figure 11:
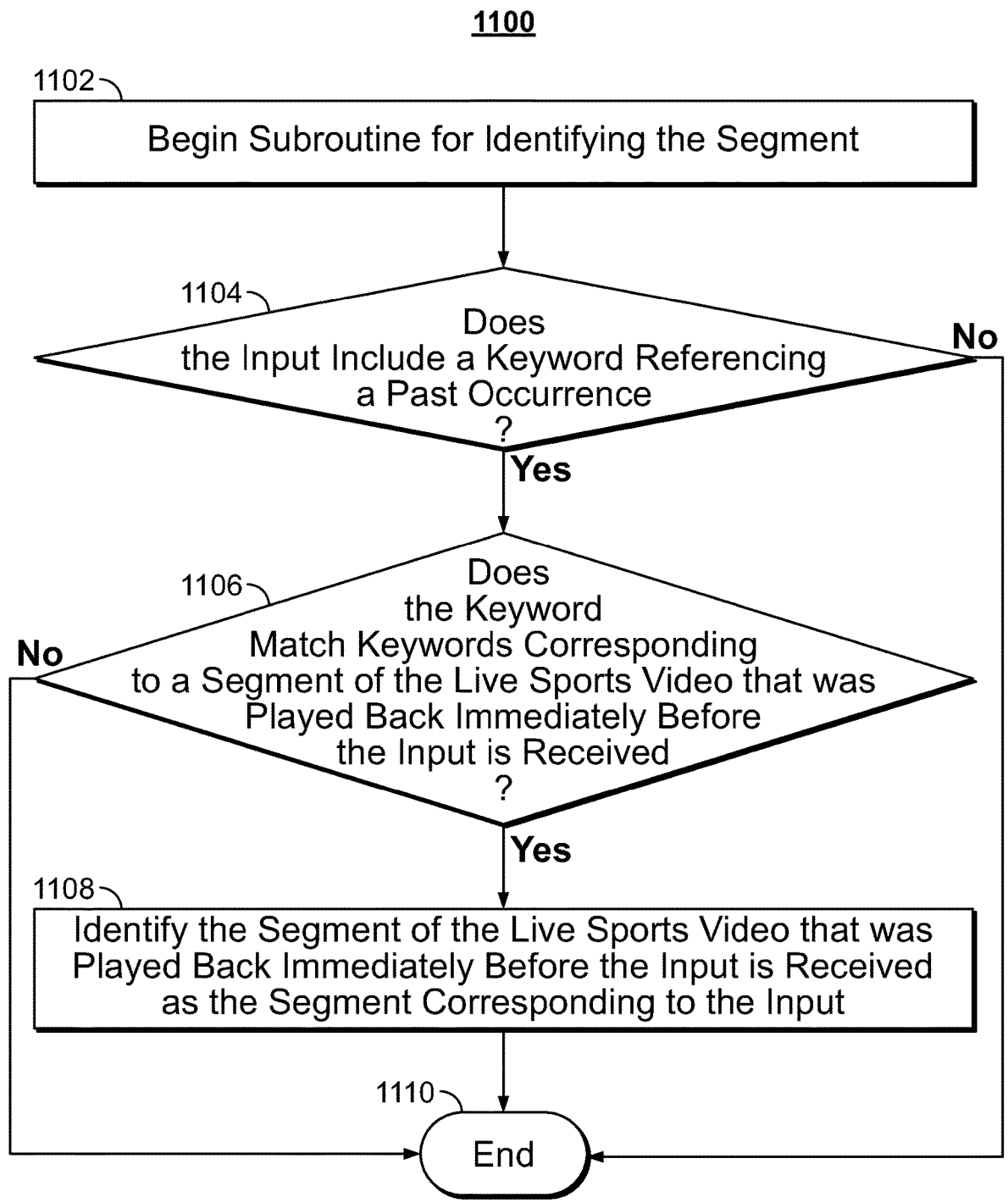
FIG. 11 is a flowchart of a detailed illustrative process for identifying a segment of a live video regarding which a viewer is requesting clarification, in accordance with some embodiments of the disclosure.

FIG. 11 is a flowchart of a detailed illustrative process for identifying a segment of a live video regarding which a viewer is requesting clarification, in accordance with some embodiments of the disclosure. It should be noted that process 1100 or any step thereof could be performed on, or provided by, any of the devices shown in FIGS. 1, 2, 6, and 7. For example, process 1100 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1100 may be incorporated into or combined with one or more steps of any other process or embodiment (e.g., as described in relation to FIGS. 8-10 and 12-15). Many elements of process 1100 have been described above with respect to FIGS. 1, 2, and 3, and those descriptions have full force and effect with respect to the below description of process 1100, and thus details on previously described elements are omitted for the sake of brevity.

At 1102, control circuitry 604 begins a subroutine for identifying the segment. At 1104, control circuitry 604 determines (e.g., based on processing circuitry 606 and storage 608), whether the input includes a keyword referencing a past occurrence. For example, control circuitry 604 may determine whether the input includes the words "the last ball." In response to determining that the input does not include the keyword referencing the past occurrence, process 1100 ends at step 1110. In response to determining that the input includes the keyword referencing the past occurrence, at step 1106, control circuitry 604 determines (e.g., based on processing circuitry 606 and storage 608) whether the keyword matches a plurality of keywords corresponding to a segment of the live video 108 that was played back immediately before the input is received. For example, control circuitry 604 determines whether "the last ball" matches keywords describing a previous segment of the live video. In response to determining that the keyword does not match the plurality of keywords corresponding to the segment of the live video 108 that was played back immediately before the input is received, process 1100 ends at step 1110. In response to determining that the keyword matches the plurality of keywords corresponding to the segment of the live video 108 that was played back immediately before the input is received, at step 1108, control circuitry 604 identifies the segment of the live video 108 that was played back immediately before the input is received as the segment corresponding to the input. For example, control circuitry 604 may identify the previous segment of the live video 108 as the segment corresponding to the input.

Figure 12:
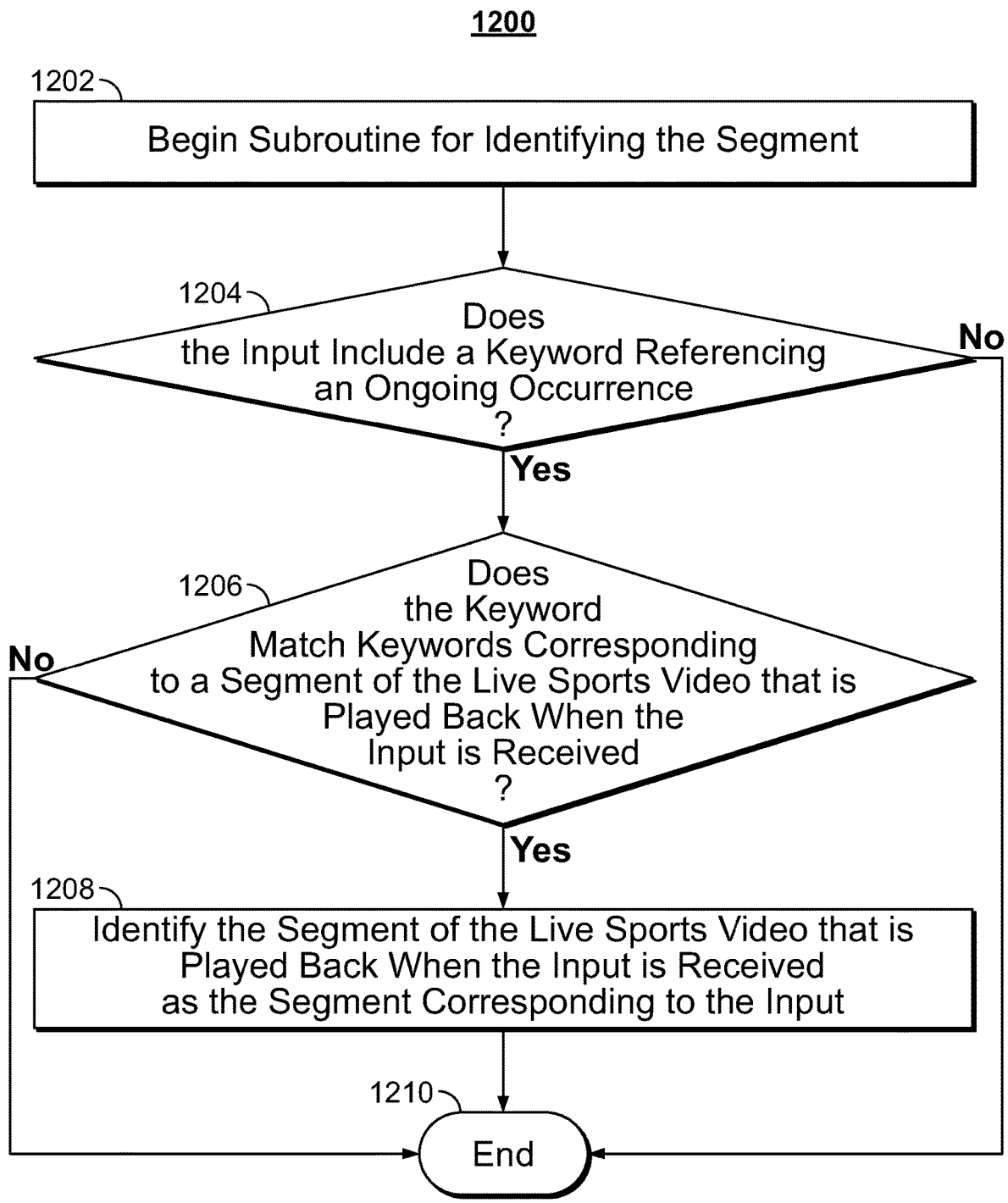
FIG. 12 is a flowchart of another detailed illustrative process for identifying a segment of a live video regarding which a viewer is requesting clarification, in accordance with some embodiments of the disclosure.

FIG. 12 is a flowchart of a detailed illustrative process for identifying a segment of a live video regarding which a viewer is requesting clarification, in accordance with some embodiments of the disclosure. It should be noted that process 1200 or any step thereof could be performed on, or provided by, any of the devices shown in FIGS. 1, 2, 3, 6, and 7. For example, process 1200 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1200 may be incorporated into or combined with one or more steps of any other process or embodiment (e.g., as described in relation to FIGS. 8-11 and 13-15). Many elements of process 1200 have been described above with respect to FIGS. 1, 2, and 3, and those descriptions have full force and effect with respect to the below description of process 1200, and thus details on previously described elements are omitted for the sake of brevity.

At 1202, control circuitry 604 begins a subroutine for identifying the segment. At 1204, control circuitry 604 determines (e.g., based on processing circuitry 606 and storage 608) that the input includes a keyword referencing an ongoing occurrence. For example, control circuitry 604 may determine whether the input includes the words "keep hitting the ball." In response to determining that the input does not include the keyword referencing the ongoing occurrence, process 1200 ends at step 1210. In response to determining that the input includes the keyword referencing the ongoing occurrence, at step 1206, control circuitry 604 determines whether the keyword matches a plurality of keywords corresponding to a segment of the live video 108 that is played back when the input is received. For example, control circuitry 604 determines whether "keep hitting the ball" matches keywords describing a current segment of the live video 108. In response to determining that the keyword does not match a keyword of the plurality of keywords corresponding to the segment of the live video 108 that is played back when the input is received, process 1200 ends at step 1210. In response to determining that the keyword matches a keyword of the plurality of keywords corresponding to the segment of the live video 108 that is played back when the input is received, at step 1208, control circuitry 604 identifies the segment of the live video 108 that is played back when the input is received as the segment corresponding to the input. For example, control circuitry 604 may identify the current segment of the live video 108 as the segment corresponding to the input.

Figure 13:
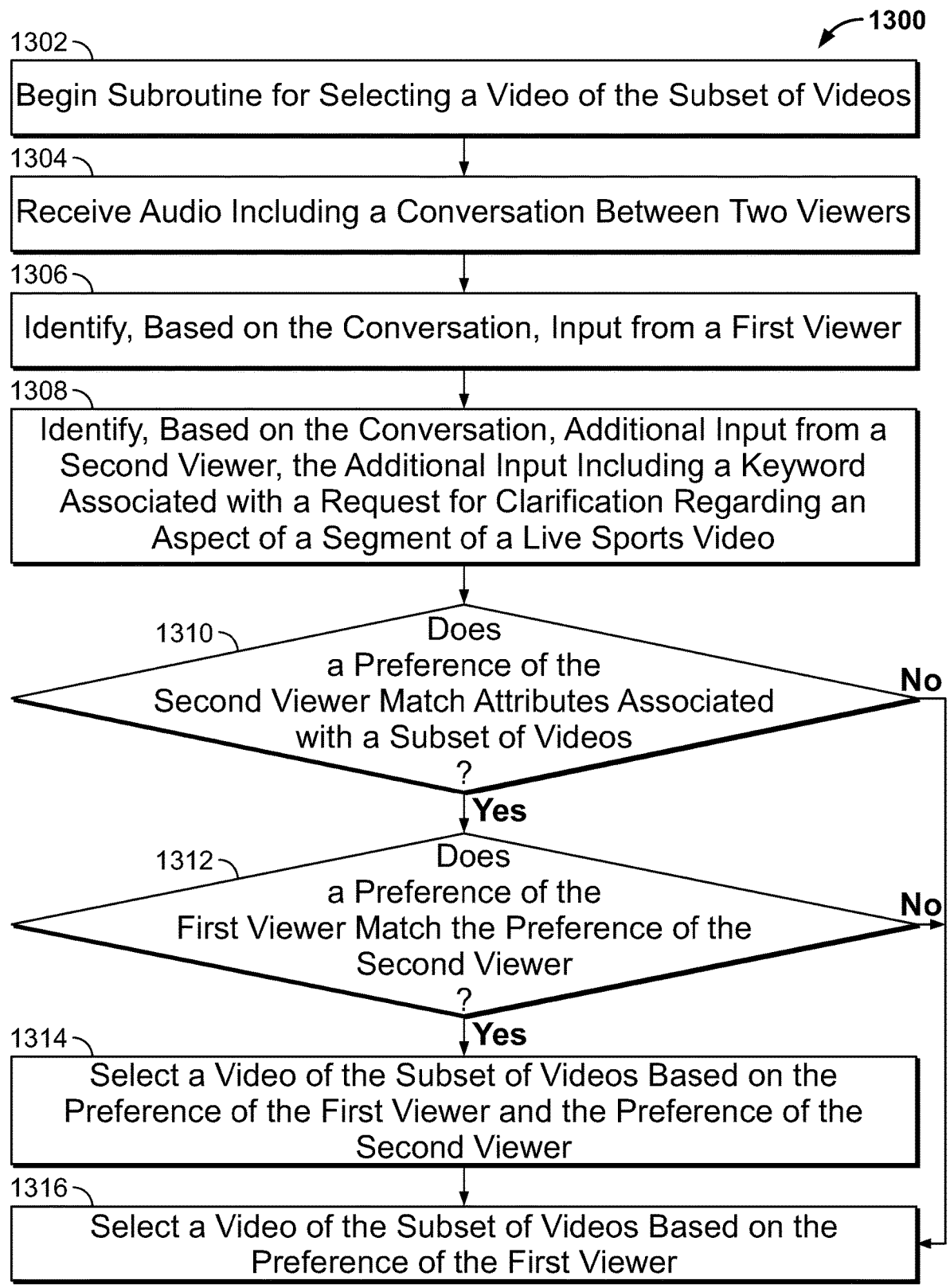
FIG. 13 is a flowchart of a detailed illustrative process for selecting a video from a subset of videos, in accordance with some embodiments of the disclosure.

FIG. 13 is a flowchart of a detailed illustrative process for selecting a video from a subset of videos, in accordance with some embodiments of the disclosure. It should be noted that process 1300 or any step thereof could be performed on, or provided by, any of the devices shown in FIGS. 1, 2, 3, 6, and 7. For example, process 1300 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1300 may be incorporated into or combined with one or more steps of any other process or embodiment (e.g., as described in relation to FIGS. 8-12, 14, and 15). Many elements of process 1300 have been described above with respect to FIGS. 1, 2, and 3, and those descriptions have full force and effect with respect to the below description of process 1300, and thus details on previously described elements are omitted for the sake of brevity.

At 1302, control circuitry 604 begins a subroutine for selecting a video of the subset of videos. At 1304, control circuitry 604 receives (e.g., via user input interface 610) audio including a conversation between at least two viewers of the plurality of viewers. For example, control circuitry 604 may receive audio corresponding to words spoken by the first viewer 102*a* and the second viewer 102*b*. At 1306, control circuitry 604 identifies, based on the conversation, the input from the first viewer 102*a*. For example, control circuitry 604 may isolate, via digital signal processing, the words spoken by the first viewer 102*a*. At 1308, control circuitry 606 identifies, based on the conversation, additional input from a second viewer 102*b* of the plurality of viewers, the additional input including a keyword associated with a request for clarification regarding the aspect of the segment of the live video 108. For example, control circuitry 604 may isolate, via digital signal processing, the words spoken by the second viewer 102*b*. At 1310, control circuitry 604 compares a preference of the second viewer 102*b* to an attribute associated with the subset of the plurality of videos to determine (e.g., based on processing circuitry 606 and storage 608) whether the preference of the second viewer 102*b* matches the attribute associated with the subset of the plurality of videos. For example, the second viewer 102*b* may prefer videos including explanatory graphics, and control circuitry 604 may determine whether any of the videos included in the subset of the plurality of videos includes explanatory graphics. In response to determining that the preference of the second viewer 102*b* does not match the attribute associated with the subset of the plurality of videos, process 1300 skips to step 1316. In response to determining that the preference of the second viewer 102*b* matches the attribute associated with the subset of the plurality of videos, at step 1312, control circuitry 604 determines (e.g., based on processing circuitry 606 and storage 608) whether the preference of the first viewer 102*a* matches the preference of the second viewer. For example, control circuitry may determine whether the first viewer 102*a* also prefers videos including explanatory graphics. In response to determining that the preference of the first viewer 102*a* does not match the preference of the second viewer 102*b*, process 1300 skips to step 1316. In response to determining that the preference of the first viewer 102*a* matches the preference of the second viewer 102*b*, at step 1314, control circuitry 604 selects the video of the subset of videos based on the preference of the first viewer 102*a* and the preference of the second viewer 102*b*. For example, control circuitry 604 may select a video including explanatory graphics. At 1316, control circuitry 604 selects a video of the subset of videos based on the preference of the first viewer 102*a*. For example, the first viewer 102*a* may not prefer videos with explanatory graphics but may instead prefer videos generated by a particular other viewer, and the control circuitry may select a video generated by the particular other viewer.

Figure 14:
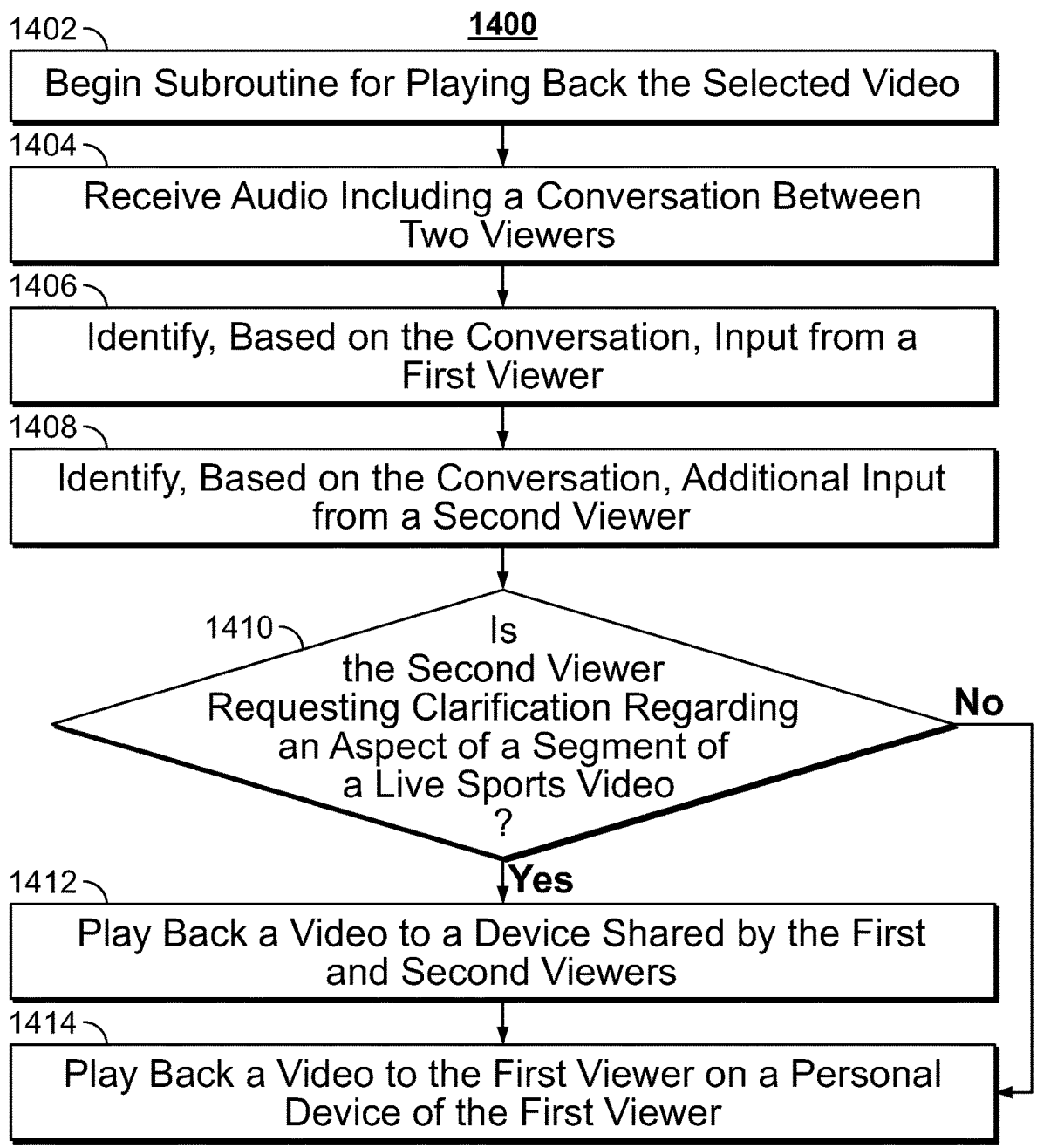
FIG. 14 is a flowchart of an illustrative process for playing back a video to a viewer, in accordance with some embodiments of the disclosure.

FIG. 14 is a flowchart of an illustrative process for playing back a video to a viewer, in accordance with some embodiments of the disclosure. It should be noted that process 1400 or any step thereof could be performed on, or provided by, any of the devices shown in FIGS. 1, 2, 3, 6, and 7. For example, process 1400 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1400 may be incorporated into or combined with one or more steps of any other process or embodiment (e.g., as described in relation to FIGS. 8-13 and 15). Many elements of process 1400 have been described above with respect to FIGS. 1, 2, and 3, and those descriptions have full force and effect with respect to the below description of process 1400, and thus details on previously described elements are omitted for the sake of brevity.

At 1402, control circuitry 604 begins a subroutine for playing back the selected video. At 1404, control circuitry 604 receives audio including a conversation between at least two viewers of the plurality of viewers. For example, control circuitry 604 may receive audio corresponding to words spoken by the first viewer 102a and the second viewer 102b. At 1406, control circuitry identifies, based on the conversation, the input from the first viewer 102a. For example, control circuitry 604 may isolate, via digital signal processing, the words spoken by the first viewer 102a. At 1408, control circuitry 604 identifies, based on the conversation, additional input from a second viewer 102b of the plurality of viewers. For example, control circuitry 604 may isolate, via digital signal processing, the words spoken by the second viewer 102b. At 1410, control circuitry determines (e.g., based on processing circuitry 606 and storage 608), based on the additional input, whether the second viewer 102b is requesting clarification regarding the aspect of the segment of the live video 108. For example, control circuitry 604 may determine if the words spoken by the second viewer include a request for clarification. In response to determining that the second viewer 102b is requesting clarification regarding the aspect of the segment of the live video 108, at step 1412, control circuitry plays back the selected video 206 to a user device shared by the first and second viewers. For example, control circuitry 604 may play back the selected video on a user device (e.g., a television device) that both the first user 102a and the second user 102b are viewing. In response to determining that the second viewer 102b is not requesting clarification regarding the aspect of the segment of the live video 108, at step 1414, control circuitry 604 plays back the selected video 308 to the first viewer 102a on a personal device 306 of the first viewer 102a. For example, control circuitry 604 may play back the selected video on a user device that only the first user 102a is viewing.

Figure 15:
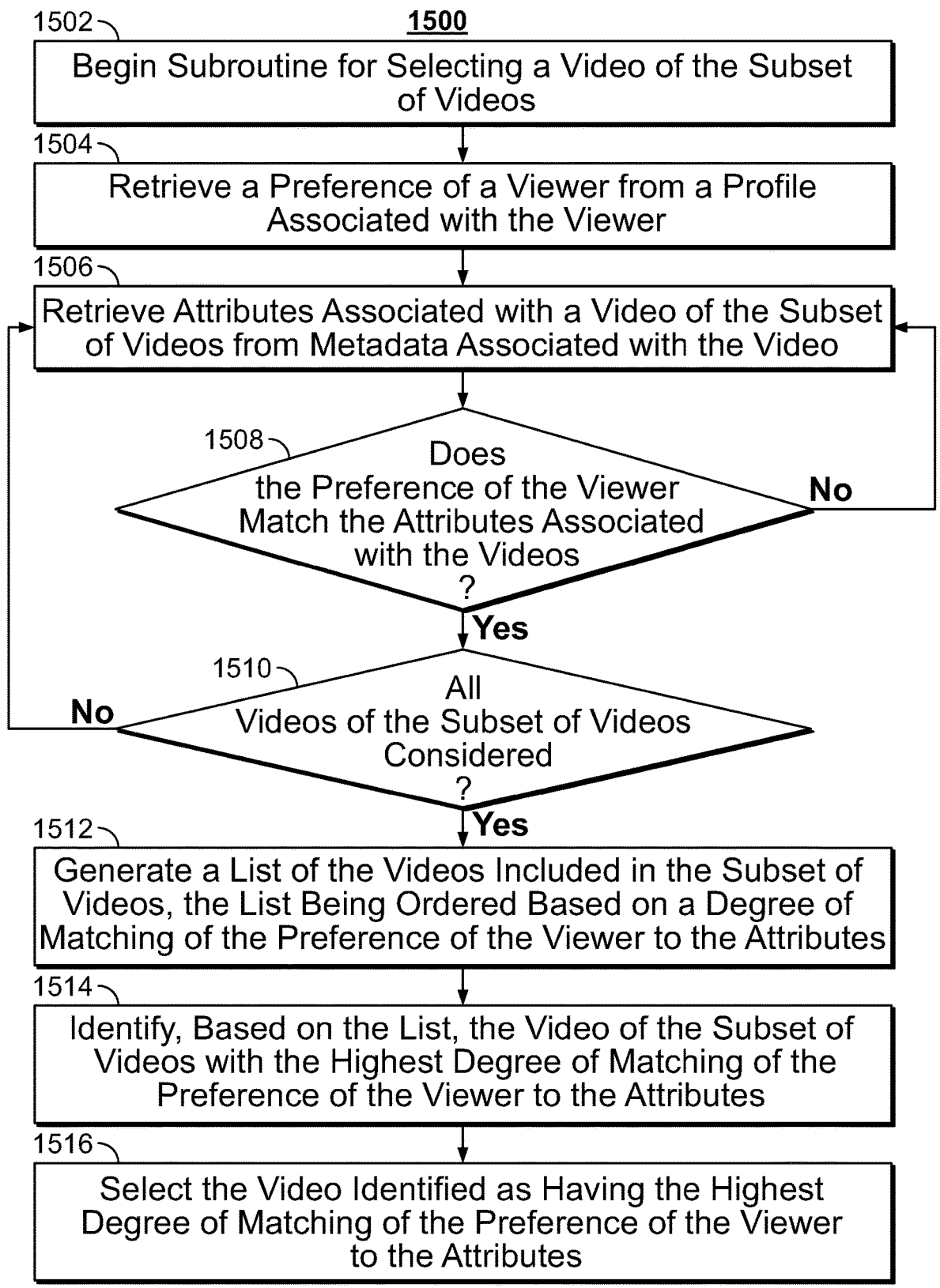
FIG. 15 is a flowchart of another detailed illustrative process for selecting a video from a subset of videos, in accordance with some embodiments of the disclosure.

FIG. 15 is a flowchart of a detailed illustrative process for selecting a video from a subset of videos, in accordance with some embodiments of the disclosure. It should be noted that process 1500 or any step thereof could be performed on, or provided by, any of the devices shown in FIGS. 1, 2, 3, 6, and 7. For example, process 1500 may be executed by control circuitry 604 (FIG. 6) as instructed by a media guidance application implemented on user equipment 110 (which may have the functionality of any or all of user equipment 702, 704, and/or 706 (FIG. 7)). In addition, one or more steps of process 1500 may be incorporated into or combined with one or more steps of any other process or embodiment (e.g., as described in relation to FIGS. 8-14). Many elements of process 1500 have been described above with respect to FIGS. 1, 2, and 3, and those descriptions have full force and effect with respect to the below description of process 1500, and thus details on previously described elements are omitted for the sake of brevity.

At 1502, control circuitry 604 begins a subroutine for selecting a video of the subset of videos. At 1504, control circuitry 604 retrieves (e.g., from storage 608) the preference of the first viewer 102a from a profile associated with the first viewer 102a. For example, control circuitry 604 may extract a preference of the first viewer 102a indicating that the first viewer prefers videos with explanatory graphics from a user profile. At 1506, control circuitry 604 retrieves (e.g., from storage 608) the attribute associated with each video of the subset of the plurality of videos from metadata associated with each video of the subset of the plurality of videos. For example, control circuitry 604 may extract an attribute indicating that the videos include explanatory graphics associated with the videos from metadata associated with the videos. At 1508, control circuitry 604 determines (e.g., based on processing circuitry 606 and storage 608) whether the preference of the first viewer 102a matches the attribute. For example, control circuitry 604 may compare the preference of the first viewer 102a with the attribute associated with the videos to determine if the preference matches the attribute. In response to determining that the preference of the first viewer 102a does not match the attribute, process 1500 returns to step 1506. In response to determining that the preference of the first viewer 102b matches the attribute, at step 1510, control circuitry 604 determines (e.g., based on processing circuitry 606 and storage 608) whether all videos of the subset of videos have been considered. For example, control circuitry 604 may determine if there are any videos included in the subset that have not yet had an attribute compared to the user preference. In response to determining that all videos of the subset of videos have not been considered, process 1500 returns to step 1506. In response to determining that all videos of the subset of videos have been considered, at step 1512, control circuitry 604 generates a list of the videos included in the subset of the plurality of videos, the list being ordered based on a degree of matching of the preference of the first viewer 102a to the attribute. For example, control circuitry 604 may sort the list of videos to arrange the videos from a highest degree of matching to a lowest degree of matching. At 1514, control circuitry 604 identifies, based on the list, the video of the subset of the plurality of videos with the highest degree of matching of the preference of the first viewer 102a to the attribute. At 1516, control circuitry 604 selects the video 206 of the subset of the plurality of videos identified as having the highest degree of matching of the preference of the first viewer 102a to the attribute.

It is contemplated that the steps or descriptions of each of FIGS. 8-15 may be used with any other embodiment of this disclosure. In addition, the steps and descriptions described in relation to FIGS. 8-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 2, 3, 6, and 7 could be used to perform one or more of the steps in FIGS. 8-15.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing a viewer with relevant commentary for a live video, the method comprising:
    playing back a live video that is transmitted, at a transmission start time, simultaneously to a plurality of viewers;
    receiving, during playback of the live video, input from a first viewer of the plurality of viewers, the input including a reference to an aspect of a segment of the live video;
    identifying the segment corresponding to the input;
    identifying a plurality of videos generated by other viewers of the plurality of viewers, each of the plurality of videos comprising a video component including the segment and an audio component including a plurality of words;
    identifying the plurality of words included in the audio component of each of the plurality of videos;
    comparing, as a first comparing, the plurality of words included in the audio component of each of the plurality of videos with words associated with the aspect;
    identifying, based on the first comparing, a subset of the plurality of videos where the audio component relates to the aspect;
    comparing, as a second comparing, a preference of the first viewer to an attribute associated with the subset of the plurality of videos;
    selecting a video of the subset of the plurality of videos based on the second comparing; and
    playing back the selected video to the first viewer.

2. The method according to claim 1, wherein receiving the input from the first viewer comprises:
    receiving voice input from the first viewer;
    generating an audio signature based on the voice input received from the first viewer;
    comparing the audio signature with a plurality of templates stored in a database, each respective template of the plurality of templates corresponding to a respective plurality of keywords associated with a request for clarification regarding the aspect of the segment of the live video;
    determining that the audio signature matches a respective template; and
    identifying, based on the respective keywords corresponding to the respective template, the aspect for which the first viewer is requesting clarification.

3. The method according to claim 2, wherein determining that the audio signature matches the respective template comprises:
    comparing words included in the audio signature with words included in the respective template;
    comparing a tone included in the audio signature with a tone included in the respective template; and
    determining that the words and the tone included in the audio signature matches the words and the tone included in the respective template.

4. The method according to claim 1, wherein identifying the segment corresponding to the input further comprises:
    determining that the input includes a keyword referencing a past occurrence;
    in response to determining that the input includes the keyword referencing the past occurrence, determining whether the keyword matches a plurality of keywords corresponding to a segment of the live video that was played back immediately before the input is received; and
    in response to determining that the keyword matches the plurality of keywords corresponding to the segment of the live video that was played back immediately before the input is received, identifying the segment of the live video that was played back immediately before the input is received as the segment corresponding to the input.

5. The method according to claim 1, wherein identifying the segment corresponding to the input further comprises:
    determining that the input includes a keyword referencing an ongoing occurrence;
    in response to determining that the input includes the keyword referencing the ongoing occurrence, determining whether the keyword matches a plurality of keywords corresponding to a segment of the live video that is played back when the input is received; and
    in response to determining that the keyword matches a keyword of the plurality of keywords corresponding to the segment of the live video that is played back when the input is received, identifying the segment of the live video that is played back when the input is received as the segment corresponding to the input.

6. The method according to claim 1, wherein receiving the input from the first viewer further comprises:
    receiving audio including a conversation between at least two viewers of the plurality of viewers;
    identifying, based on the conversation, the input from the first viewer;
    identifying, based on the conversation, additional input from a second viewer of the plurality of viewers, the additional input including a keyword associated with a request for clarification regarding the aspect of the segment of the live video;
    comparing a preference of the second viewer to an attribute associated with the subset of the plurality of videos, and
    wherein selecting the video of the subset of the plurality of videos further comprises:
    determining whether the preference of the first viewer matches the preference of the second viewer; and
    in response to determining that the preference of the first viewer matches the preference of the second viewer, selecting the video of the subset of videos based on the preference of the first viewer and the preference of the second viewer.

7. The method according to claim 1, wherein receiving the input from the first viewer further comprises:
   receiving audio including a conversation between at least two viewers of the plurality of viewers,
   identifying, based on the conversation, the input from the first viewer,
   identifying, based on the conversation, additional input from a second viewer of the plurality of viewers,
   determining, based on the additional input, that the second viewer is not requesting clarification regarding the aspect of the segment of the live video, and
   wherein playing back the selected video to the first viewer further comprises playing back the selected video on a personal device of the first viewer.

8. The method according to claim 1, further comprising:
   receiving, in response to playback of the selected video, additional input from the first viewer;
   identifying, based on the additional input, a request for further clarification regarding the aspect of the segment of the live video;
   identifying, based on the request for additional clarification, a specification of a portion of the aspect for which the first viewer is requesting clarification;
   identifying, based on the specification, a second subset of the plurality of videos;
   comparing the preference of the first viewer to an attribute associated with the second subset of the plurality of videos;
   selecting a video of the second subset of the plurality of videos based on the comparison of the preference of the first viewer to the attribute associated with the second subset of the plurality of videos; and
   playing back the selected video from the second subset of the plurality of videos to the first viewer.

9. The method according to claim 1, wherein comparing the preference of the first viewer to the attribute associated with the subset of the plurality of videos further comprises:
   retrieving the preference of the first viewer from a profile associated with the first viewer;
   retrieving the attribute associated with each video of the subset of the plurality of videos from metadata associated with each video of the subset of the plurality of videos; and
   for each video of the subset of the plurality of videos, determining whether the preference of the first viewer matches the attribute.

10. The method according to claim 9, further comprising:
    in response to determining whether the preference of the first viewer matches the attribute, generating a list of the videos included in the subset of the plurality of videos, the list being ordered based on a degree of matching of the preference of the first viewer to the attribute; and
    identifying, based on the list, the video of the subset of the plurality of videos with the highest degree of matching of the preference of the first viewer to the attribute,
    wherein selecting a video of the subset of the plurality of videos further comprises selecting the video identified as having the highest degree of matching of the preference of the first viewer to the attribute.

11. A system for providing a viewer with relevant commentary for a live video, the system comprising:
    control circuitry configured to:
    play back a live video that is transmitted, at a transmission start time, simultaneously to a plurality of viewers;
    receive, during playback of the live video, input from a first viewer of the plurality of viewers, the input including a reference to an aspect of a segment of the live video;
    identify the segment corresponding to the input;
    identify a plurality of videos generated by other viewers of the plurality of viewers, each of the plurality of videos comprising a video component including the segment and an audio component including a plurality of words;
    identify the plurality of words included in the audio component of each of the plurality of videos;
    compare, as a first comparison, the plurality of words included in the audio component of each of the plurality of videos with words associated with the aspect;
    identify, based on the first comparison, a subset of the plurality of videos where the audio component relates to the aspect;
    compare, as a second comparison, a preference of the first viewer to attribute associated with the subset of the plurality of videos;
    select a video of the subset of the plurality of videos based on the second comparison; and
    play back the selected video to the first viewer.

12. The system according to claim 11, wherein the control circuitry, when receiving the input from the first viewer, is further configured to:
    receive voice input from the first viewer;
    generate an audio signature based on the voice input received from the first viewer;
    compare the audio signature with a plurality of templates stored in a database, each respective template of the plurality of templates corresponding to a respective plurality of keywords associated with a request for clarification regarding the aspect of the segment of the live video;
    determine that the audio signature matches a respective template; and
    identify, based on the respective keywords corresponding to the respective template, the aspect for which the first viewer is requesting clarification.

13. The system according to claim 12, wherein the control circuitry, when determining that the audio signature matches the respective template, is further configured to:
    compare words included in the audio signature with words included in the respective template;
    compare a tone included in the audio signature with a tone included in the respective template; and
    determine that the words and the tone included in the audio signature matches the words and the tone included in the respective template.

14. The system according to claim 11, wherein the control circuitry, when identifying the segment corresponding to the input, is further configured to:
    determine that the input includes a keyword referencing a past occurrence;
    in response to determining that the input includes the keyword referencing the past occurrence, determine whether the keyword matches a plurality of keywords corresponding to a segment of the live video that was played back immediately before the input is received; and
    in response to determining that the keyword matches the plurality of keywords corresponding to the segment of the live video that was played back immediately before the input is received, identify the segment of the live video that was played back immediately before the input is received as the segment corresponding to the input.

15. The system according to claim 11, wherein the control circuitry, when identifying the segment corresponding to the input, is further configured to:
   determine that the input includes a keyword referencing an ongoing occurrence;
   in response to determining that the input includes the keyword referencing the ongoing occurrence, determine whether the keyword matches a plurality of keywords corresponding to a segment of the live video that is played back when the input is received; and
   in response to determining that the keyword matches a keyword of the plurality of keywords corresponding to the segment of the live video that is played back when the input is received, identify the segment of the live video that is played back when the input is received as the segment corresponding to the input.

16. The system according to claim 11, wherein the control circuitry, when receiving the input from the first viewer, is further configured to:
   receive audio including a conversation between at least two viewers of the plurality of viewers;
   identify, based on the conversation, the input from the first viewer;
   identify, based on the conversation, additional input from a second viewer of the plurality of viewers, the additional input including a keyword associated with a request for clarification regarding the aspect of the segment of the live video;
   compare a preference of the second viewer to an attribute associated with the subset of the plurality of videos, and
   wherein the control circuitry, when selecting the video of the subset of the plurality of videos, is further configured to:
   determine whether the preference of the first viewer matches the preference of the second viewer; and
   in response to determining that the preference of the first viewer matches the preference of the second viewer, select the video of the subset of videos based on the preference of the first viewer and the preference of the second viewer.

17. The system according to claim 11, wherein the control circuitry, when receiving the input from the first viewer, is further configured to:
   receive audio including a conversation between at least two viewers of the plurality of viewers,
   identify, based on the conversation, the input from the first viewer,
   identify, based on the conversation, additional input from a second viewer of the plurality of viewers,
   determine, based on the additional input, that the second viewer is not requesting clarification regarding the aspect of the segment of the live video, and
   wherein the control circuitry, when playing back the selected video to the first viewer, is further configured to play back the selected video on a personal device of the first viewer.

18. The system according to claim 11, wherein the control circuitry is further configured to:
   receive, in response to playback of the selected video, additional input from the first viewer;
   identify, based on the additional input, a request for further clarification regarding the aspect of the segment of the live video;
   identify, based on the request for additional clarification, a specification of a portion of the aspect for which the first viewer is requesting clarification;
   identify, based on the specification, a second subset of the plurality of videos;
   compare the preference of the first viewer to an attribute associated with the second subset of the plurality of videos;
   select a video of the second subset of the plurality of videos based on the comparison of the preference of the first viewer to an attribute associated with the second subset of the plurality of videos; and
   play back the selected video from the second subset of the plurality of videos to the first viewer.

19. The system according to claim 11, wherein the control circuitry, when comparing the preference of the first viewer to the attribute associated with the subset of the plurality of videos, is further configured to:
   retrieve the preference of the first viewer from a profile associated with the first viewer;
   retrieve the attribute associated with each video of the subset of the plurality of videos from metadata associated with each video of the subset of the plurality of videos; and
   for each video of the subset of the plurality of videos, determine whether the preference of the first viewer matches the attribute.

20. The system according to claim 19, wherein the control circuitry is further configured to:
   in response to determining whether the preference of the first viewer matches the attribute, generate a list of the videos included in the subset of the plurality of videos, the list being ordered based on a degree of matching of the preference of the first viewer to the attribute; and
   identify, based on the list, the video of the subset of the plurality of videos with the highest degree of matching of the preference of the first viewer to the attribute,
   wherein the control circuitry, when selecting a video of the subset of the plurality of videos, is further configured to select the video identified as having the highest degree of matching of the preference of the first viewer to the attribute.

* * * * *